US011257099B2

(12) United States Patent
Schnell et al.

(10) Patent No.: US 11,257,099 B2
(45) Date of Patent: Feb. 22, 2022

(54) CONTENT PREVIEW

(71) Applicant: Microsoft Technology Licensing, LLC, Redmond, WA (US)

(72) Inventors: Patrik Schnell, Issaquah, CA (US); Clifford P. Strom, Sammamish, WA (US); Adrian J. Oney, Woodinville, WA (US); Mark L. Beaubien, Kent, WA (US); Kedarnath A. Dubhashi, Redmond, WA (US); Alexandre V. Grigorovitch, Redmond, WA (US); Anand Paka, Redmond, WA (US); Satvir Randhawa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 903 days.

(21) Appl. No.: 15/716,273

(22) Filed: Sep. 26, 2017

(65) Prior Publication Data

US 2018/0018677 A1 Jan. 18, 2018

Related U.S. Application Data

(62) Division of application No. 11/734,694, filed on Apr. 12, 2007, now Pat. No. 9,805,374.

(51) Int. Cl.
*G06Q 30/02* (2012.01)
*G06C 3/00* (2006.01)
*G06Q 20/00* (2012.01)

(52) U.S. Cl.
CPC ............... *G06Q 30/02* (2013.01); *G06C 3/00* (2013.01); *G06Q 20/00* (2013.01)

(58) Field of Classification Search
CPC ........... G06Q 30/02; G06Q 20/00; G06C 3/00
(Continued)

(56) References Cited

U.S. PATENT DOCUMENTS 5,629,980 A 5/1997 Stefik et al.
5,892,900 A 4/1999 Ginter et al.
(Continued)

FOREIGN PATENT DOCUMENTS

CN 1488112 A 4/2004
CN 1503944 A 6/2004
(Continued)

OTHER PUBLICATIONS

OMA (DRM Specification, Jul. 16, 2004, attached as PDF file), (Year: 2004).*
(Continued)

*Primary Examiner* — James D Nigh
*Assistant Examiner* — Margaret M Neubig
(74) *Attorney, Agent, or Firm* — Ray Quinney & Nebeker P.C.; John O. Carpenter

(57) ABSTRACT

Techniques enable creation of a preview license for digital content. In some instances, the preview license indicates that it allows a content-consuming device to consume less than all of the content. This preview license may create a list specifying multiple portions of the digital content that the content-consuming device may consume. These techniques may also present to a device user an offer to purchase rights to consume all of the digital content after consumption of the preview-licensed portion(s). In other instances, a content server may embed the preview license into a content package that contains the digital content, allowing the server to distribute the package to multiple devices. In still other instances, the preview license may be bound to a domain rather than to individual devices. This allows member devices to share the digital content and the preview license, such that each member device may enjoy the preview experience.

20 Claims, 14 Drawing Sheets

(58) Field of Classification Search
USPC .................................................. 705/50–79
See application file for complete search history.

(56) References Cited

U.S. PATENT DOCUMENTS

| | | | |
|---|---|---|---|
| 6,397,232 B1 | 5/2002 | Cheng-Hung et al. | |
| 6,453,419 B1 | 9/2002 | Flint et al. | |
| 6,463,534 B1 | 10/2002 | Geiger et al. | |
| 6,735,699 B1 | 5/2004 | Sasaki et al. | |
| 6,865,555 B2 | 3/2005 | Novak | |
| 7,003,578 B2 | 2/2006 | Kanada et al. | |
| 7,096,504 B1 | 8/2006 | Tagawa et al. | |
| 7,136,945 B2 | 11/2006 | Gibbs et al. | |
| 7,191,332 B1 | 3/2007 | Pankajakshan et al. | |
| 7,415,439 B2 | 8/2008 | Kontio et al. | |
| 7,581,255 B2 | 8/2009 | Alkove et al. | |
| 7,676,846 B2 | 3/2010 | Robert et al. | |
| 7,707,605 B2 | 4/2010 | Yamada et al. | |
| 7,716,191 B2 | 5/2010 | Blumenau et al. | |
| 7,742,997 B1 | 6/2010 | Brenner et al. | |
| 7,747,851 B1 | 6/2010 | Robinson et al. | |
| 2001/0014906 A1 | 8/2001 | Yamada et al. | |
| 2002/0019814 A1 | 2/2002 | Ganesan | |
| 2002/0054087 A1 | 5/2002 | Noll et al. | |
| 2002/0059363 A1 | 5/2002 | Katz et al. | |
| 2002/0077986 A1 | 6/2002 | Kobata et al. | |
| 2002/0116517 A1 | 8/2002 | Hudson et al. | |
| 2002/0157002 A1 | 10/2002 | Messerges et al. | |
| 2002/0188570 A1 | 12/2002 | Holliman et al. | |
| 2003/0110376 A1 | 6/2003 | Weiner et al. | |
| 2004/0039754 A1 | 2/2004 | Harple, Jr. | |
| 2004/0039834 A1 | 2/2004 | Saunders et al. | |
| 2004/0054786 A1* | 3/2004 | Kjellberg | H04L 67/2819 709/228 |
| 2004/0054920 A1 | 3/2004 | Wilson et al. | |
| 2004/0059929 A1 | 3/2004 | Rodgers et al. | |
| 2004/0068536 A1 | 4/2004 | Demers et al. | |
| 2004/0083487 A1 | 4/2004 | Collens et al. | |
| 2004/0098413 A1 | 5/2004 | Peng | |
| 2004/0103312 A1* | 5/2004 | Messerges | H04L 63/065 726/10 |
| 2004/0143760 A1 | 7/2004 | Alkove et al. | |
| 2004/0162870 A1 | 8/2004 | Matsuzaki et al. | |
| 2004/0167926 A1 | 8/2004 | Waxman et al. | |
| 2004/0193544 A1* | 9/2004 | Varadarajan | G06Q 30/02 705/59 |
| 2004/0196972 A1 | 10/2004 | Zhu et al. | |
| 2004/0220926 A1 | 11/2004 | Lamkin et al. | |
| 2005/0002525 A1 | 1/2005 | Alkove et al. | |
| 2005/0039034 A1 | 2/2005 | Doyle et al. | |
| 2005/0066353 A1 | 3/2005 | Fransdonk | |
| 2005/0086501 A1 | 4/2005 | Woo et al. | |
| 2005/0091488 A1 | 4/2005 | Dunbar et al. | |
| 2005/0119977 A1 | 6/2005 | Raciborski | |
| 2005/0125358 A1 | 6/2005 | Levin et al. | |
| 2005/0132295 A1 | 6/2005 | Noll et al. | |
| 2005/0192878 A1 | 9/2005 | Minear et al. | |
| 2005/0198510 A1 | 9/2005 | Robert et al. | |
| 2005/0240961 A1* | 10/2005 | Jerding | H04N 21/4314 725/37 |
| 2005/0278259 A1 | 12/2005 | Gunaseelan et al. | |
| 2006/0015945 A1 | 1/2006 | Fields | |
| 2006/0059106 A1* | 3/2006 | Chase, Jr. | G06F 21/10 705/59 |
| 2006/0190404 A1 | 8/2006 | Stefik et al. | |
| 2006/0206708 A1 | 9/2006 | Son et al. | |
| 2006/0212435 A1 | 9/2006 | Williams et al. | |
| 2006/0212943 A1 | 9/2006 | Kitazato et al. | |
| 2006/0235800 A1 | 10/2006 | Furlong et al. | |
| 2006/0242079 A1 | 10/2006 | Evans et al. | |
| 2007/0016531 A1 | 1/2007 | Boomershine et al. | |
| 2007/0061886 A1 | 3/2007 | Le | |
| 2007/0079380 A1 | 4/2007 | Kawaguchi et al. | |
| 2007/0129990 A1 | 6/2007 | Tzruya et al. | |
| 2007/0143219 A1 | 6/2007 | Shen et al. | |
| 2007/0180136 A1 | 8/2007 | Li et al. | |
| 2007/0185814 A1 | 8/2007 | Boccon-Gibod et al. | |
| 2007/0192789 A1 | 8/2007 | Medford | |
| 2007/0203838 A1 | 8/2007 | Lee et al. | |
| 2007/0204078 A1* | 8/2007 | Boccon-Gibod | G06F 21/64 710/54 |
| 2007/0208668 A1 | 9/2007 | Candelore | |
| 2007/0255943 A1 | 11/2007 | Kern et al. | |
| 2008/0098481 A1* | 4/2008 | Lee | H04L 9/0825 726/26 |
| 2008/0115225 A1* | 5/2008 | Jogand-Coulomb | G06F 21/10 726/27 |
| 2008/0133414 A1 | 6/2008 | Qin et al. | |
| 2009/0210698 A1 | 8/2009 | Candelore | |
| 2009/0217036 A1 | 8/2009 | Irwin et al. | |

FOREIGN PATENT DOCUMENTS

| | | |
|---|---|---|
| KR | 20030006817 A | 1/2003 |
| KR | 20060049669 A | 5/2006 |
| TW | 200711374 A | 3/2007 |
| WO | 2004023717 A2 | 3/2004 |
| WO | 2004063933 A1 | 7/2004 |

OTHER PUBLICATIONS

OMA (DRM Specification, Jul. 16, 2004, downloaded from https://www.openmobilealliance.org/release/DRM/V2_0-20040715-C/OMA-DRM-DRM-V2_0-20040716-C.pdf; attached as PDF file) (Year: 2004).*

4. "The Open Mobile Alliance Digital Rights Management", downloaded from http://www.hit.bme.hu/~jakab/edu/litr/DRM/OMA_DRM_04049925.pdf and attached as a PDF file; dated Jan. 2007. (Year: 2007).*

OMA (DRM Specification, Jul. 16, 2004, attached as PDF file, downloaded from http://www.openmobilealliance.org/release/DRM/V2_0-20040715-C/OMA-DRM-DRM-V2_0-20040716-C.pdf) (Year: 2004).*

"The Open Mobile Alliance Digital Rights Management", downloaded from http://www.hit.bme.hu/~jakab/edu/litr/DRM/OMA_DRM_04049925.pdf and attached as a PDF file; dated Jan. 2007. (Year: 2007).*

"The Cyrptolope Live! Product", IBM Cryptolope Live!, General Information Guide, Version 1, Release 1, Jan. 1, 1997, 36 Pages.

"Search Report Issued In European Patent Application No. 08744321.4", dated Feb. 26, 2016, 7 Pages.

"Office Action Issued In Taiwan Patent Application No. 097111887", dated Dec. 10, 2013, 11 Pages.

"Final Office Action Issued In U.S. Appl. No. 11/734,694", dated Oct. 14, 2010, 11 Pages.

"Final Office Action Issued In U.S. Appl. No. 11/734,694", dated Jun. 27, 2013, 13 Pages.

"Non Final Office Action Issued In U.S. Appl. No. 11/734,694", dated Jul. 19, 2012, 13 Pages.

"Non Final Office Action Issued In U.S. Appl. No. 11/734,694", dated Mar. 25, 2010, 13 Pages.

"Notice of Allowance Issued In U.S. Appl. No. 11/734,694", dated Jun. 26, 2017, 11 Pages.

"Non Final Office Action Issued In U.S. Appl. No. 11/734,704", dated Oct. 26, 2011, 26 Pages.

"Office Action Issued In U.S. Appl. No. 11/734,704", dated Mar. 28, 2013, 31 Pages.

"Office Action Issued In U.S. Appl. No. 11/734,704", dated Nov. 13, 2013, 44 Pages.

"Search Report Issued In PCT Application No. PCT/US2008/058130", dated Aug. 25, 2008, 14 Pages.

"Office Action Issued In U.S. Appl. No. 11/734,704", dated Jun. 5, 2012, 28 Pages.

"Office Action Issued In U.S. Appl. No. 11/734,704", dated Apr. 14, 2011, 25 Pages.

"Non Final Office Action Issued In U.S. Appl. No. 11/734,715", dated Aug. 19, 2011, 28 Pages.

(56) References Cited

OTHER PUBLICATIONS

"Office Action Issued In U.S. Appl. No. 11/734,715", dated Apr. 12, 2012, 26 Pages.
"Office Action Issued In U.S. Appl. No. 11/734,715", dated Aug. 5, 2010, 21 Pages.
"Office Action Issued In U.S. Appl. No. 11/734,715", dated Feb. 18, 2011, 19 Pages.
"Office Action Issued In Chinese Patent Application No. 200880021646.0", dated Apr. 10, 2012, 15 Pages.
"Office Action Issued In Chinese Patent Application No. 200880021646.0", dated Mar. 28, 2013, 11 Pages.
Kaplan, Marc A., "IBM Cryptolopes, SuperDistribution and Digital Rights Management", Retrieved From: «http://www.research.IBM.com/people/k/kaplan/cryptolope-docs/crypap.html», Dec. 30, 1996, 7 Pages.
"Office Action Issued In Chinese Patent Application No. 200880021646.0", dated Aug. 19, 2013, 11 Pages.
"Office Action Issued In Chinese patent Application No. 200880021646.0", dated Dec. 4, 2014, 11 Pages.
"Office Action Issued In Chinese Patent Application No. 200880021646.0", dated Dec. 21, 2012, 10 Pages.

* cited by examiner

CONTENT PREVIEW

CROSS-REFERENCE TO RELATED APPLICATIONS

The present application for patent is a divisional of U.S. Provisional application Ser. No. 11/734,694, entitled "CONTENT PREVIEW," filed Apr. 12, 2007. The above-referenced application is hereby expressly incorporated by reference herein.

BACKGROUND

Digital Rights Management (DRM) refers to technologies that manage access to and usage of digital content such as songs and movies. DRM associated with some piece of digital content often requires a device (e.g., a personal computer or a digital audio player) to obtain a license before being allowed to consume the digital content. Typically, this license not only allows the device to consume the digital content, but also specifies rights or restrictions by which the device may do so. The license may, for instance, allow the device to play the digital content but not copy the digital content to a second device.

In some instances, content providers wish to only allow one or more content-consuming devices to preview a portion of a digital work, such as a song or movie. These content providers traditionally accomplish this task using one of three main techniques. First, the content provider may send only the portion of the digital work down to the device. The content provider includes with this portion a license that allows the device to consume that portion of the digital work. Unfortunately, if a user of the device enjoys the previewed content and wishes to purchase the entire digital work, that user must reconnect to a network to receive the entire digital work and an associated license. Often times, however, users listen to content on a digital audio player (DAP) or the like that does not so connect to the network.

In addition, these licenses traditionally bind to a single device, such that if the device such as the DAP shares the content with a second device, the second device must acquire another license. Again, this second device may not be connected to a network, and hence may not be able to preview the content.

A second traditional technique to provide a preview experience includes sending down the entire digital work, but only encrypting a portion of the work to which the device may not access. The remaining portion, meanwhile, is left unencrypted so as to allow the device to preview this portion. Unfortunately, this leaves that portion of the work unencrypted and, hence, unprotected. Because a portion of the work is unprotected, the user of the device may alter or copy the content of that portion.

A third and final traditional technique allows a content provider to separately stream, to a content-consuming device, only a portion of a digital work in a same file as that of the entire digital work. This allows the device to consume that portion and only that portion. Unfortunately, this separate stream results in additional overhead and does not lend itself to streaming multiple portions of a digital work in an efficient manner.

SUMMARY

This document describes techniques capable of creating a preview license for digital content, the preview license clearly indicating that it allows a content-consuming device to consume less than all of the digital content. The preview license may also or instead indicate that it allows the content-consuming device to consume some or all of the digital content for a limited amount of time or a limited number of plays. In some instances, this preview license allows the content-consuming device to consume multiple portions of the digital content, and the preview license creates a list specifying these portions. Furthermore, after the device consumes the one or more portions of the digital content, a device user may be presented with an offer to purchase rights to consume all of the digital content.

In other instances, a content server may embed the preview license into a content package that contains the digital content. The content server may then distribute the content package to a plurality of devices for preview of the digital content. In still other instances, the preview license may be bound to a domain rather than to an individual device. This may allow members of the domain to share the digital content and the preview license, such that each member device may enjoy the preview experience.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion targets techniques capable of enabling seamless movement and consumption of licensed digital content amongst multiple content-consuming devices. The discussion also targets techniques to create a content preview experience, as well as techniques to package multiple assets and apply differing policy to each asset. The discussion begins with a section entitled "Managing Digital Rights in a Member-Based Domain Architecture", which describes how the claimed techniques may employ domains within a digital-rights-management (DRM) system to enable seamless movement of digital content. This section includes several sub-sections entitled "Domain Architecture", "Joining a Domain", "Consuming Digital Content at a Member Device of a Domain", "Sharing Digital Content Amongst Member Devices of a Domain", "Leaving a Domain", and "Renewability".

A second section entitled "Content Preview" follows. This section describes how the claimed techniques may create content preview licenses that allow a content-consuming device to consume less than all of received digital content. The content preview licenses may also allow the device to consume all of the received digital content for a very short period of time or for a very limited number of plays. Finally, a section entitled "Managing Digital Rights for Multiple Assets in an Envelope" follows. This section describes how the claimed techniques may group content to define assets, as well as how the claimed techniques may assign differing policies to the assets. This section also discusses how the techniques may assign a single policy to an asset that contains data of differing and arbitrary data types or formats.

This brief introduction, including section titles and corresponding summaries, is provided for the reader's convenience and is not intended to limit the scope of the claims, nor the proceeding sections.

Managing Digital Rights in a Member-Based Domain Architecture

Domain Architecture

Figure 1:
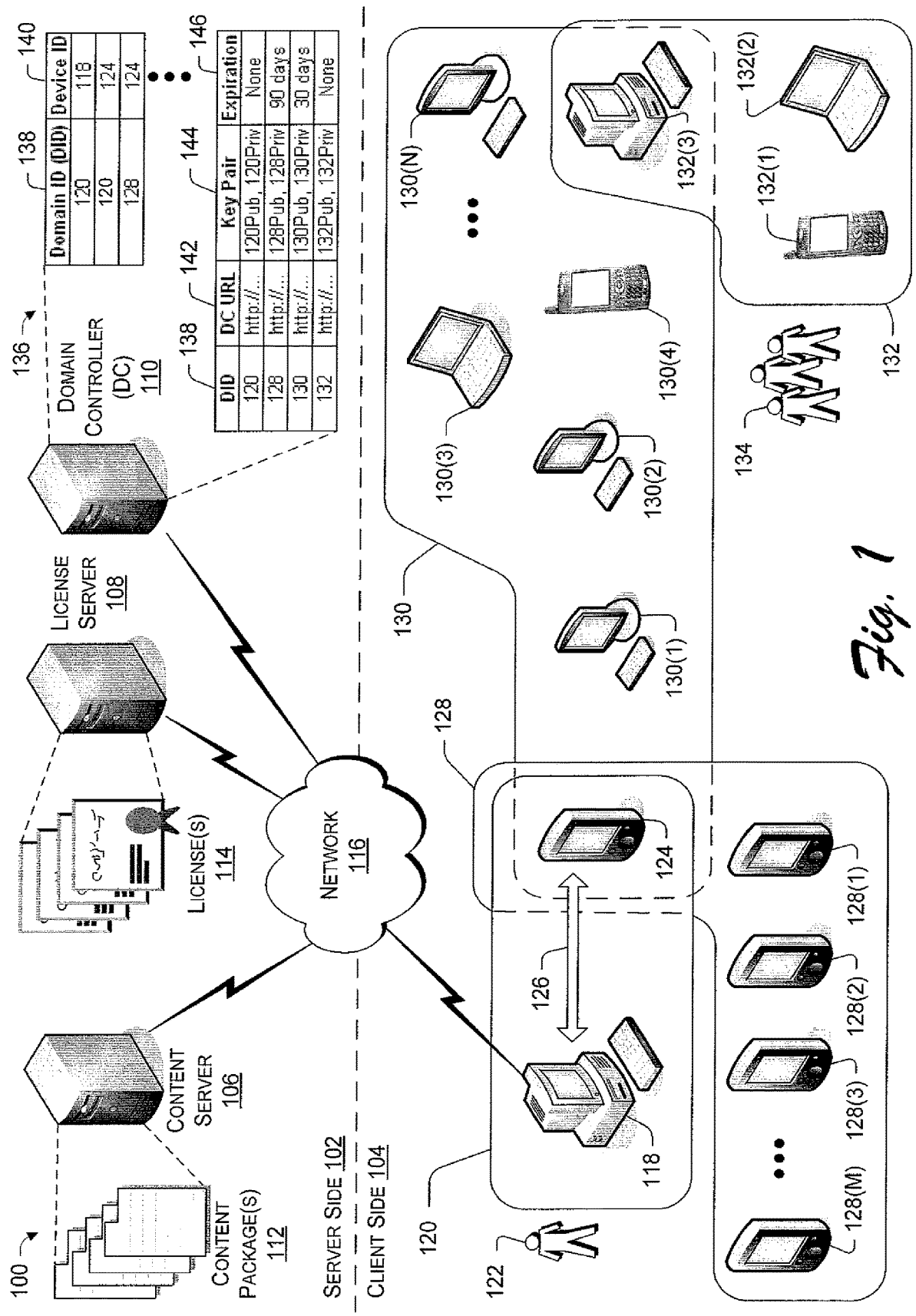
FIG. 1 illustrates a member-based domain architecture in which a content-consuming device may seamlessly move digital content and accompanying licenses amongst other members of a domain.

FIG. 1 illustrates an exemplary member-based domain architecture 100 which may employ a digital-rights-management (DRM) system. Although FIG. 1 illustrates architecture 100 with some components on a server side 102 and others on a client side 104, these components may reside in multiple other locations. For instance, all of the components of FIG. 1 may exist on client side 104. Furthermore, two or more of the illustrated components may combine to form a single component at a single location.

As illustrated, however, server side 102 of architecture 100 includes a content server 106, a license server 108, and a domain controller 110. Content server 106 includes one or more content packages 112, which may be delivered to one or more computing devices such as content-consuming devices on client side 104. Content packages generally comprise digital content, such as songs, movies, mobile-phone ring tones, images, games, and/or the like. In many cases, content packages 112 include encrypted digital content, which is accompanied by or supplemented with a license to permit consumption of the digital content. Furthermore, content packages may be provided to the content-consuming devices by multiple processes, including by downloading, progressive downloading, streaming, emailing, or the like.

License server 108, meanwhile, includes one or more licenses 114, each of which may bind to one or more domains. Each license 114 generally contains policy that specifies rights or restrictions defining how a content-consuming device is allowed to consume digital content, such as the digital content within content packages 112. For instance, the rights or restrictions may specify that a device has a right to consume the digital content. The rights or restrictions may also specify a play count that defines how many times a device may consume the content. Similarly, the rights or restrictions may specify an expiration date, after which point the device may no longer consume the digital content. Specified rights or restrictions may also include output protections to place restrictions on a device's right to copy the digital content. Furthermore, licenses 114 may include policy specifying multiple other rights or restrictions, including those well-known in conventional DRM systems.

Having described content server 106 and license server 108 as separate entities, it is specifically noted that a single server may serve both functions. In this and other instances, the single server may embed licenses within content packages and simultaneously issue both the license and the content.

Returning to FIG. 1, content server 106, license server 108, and domain controller 110 communicate with computing devices (e.g., content-consuming devices) on client side 104 via a network 116. Network 116 may comprise the Internet, a Local Area Network (LAN), a Wide Area Network (WAN), a wireless network, and/or the like. FIG. 1 specifically illustrates server-side components coupling with one type of content-consuming device, namely a personal computer 118, via network 116. In addition to personal computers, exemplary content-consuming devices include, without limitation, laptop computers, mobile phones, personal digital assistants (PDAs), portable media players (PMPs) (e.g., portable video players (PVPs) and digital audio players (DAPs)), and the like. FIG. 1 illustrates many of these exemplary devices.

Returning to personal computer 118, this device receives content from content server 106 and licenses from license server 108. License server 108, however, traditionally binds licenses to an identity of personal computer 118, such that only personal computer 118 may consume the content. As discussed above, binding a license to a single device hinders movement of the content amongst other devices.

As illustrated in FIG. 1, personal computer 118 is a member of a domain 120. A domain is a group of zero or more member computing devices, each of which contain a domain identifier that uniquely associates member devices with the corresponding domain. While domains may comprise a logical grouping of member devices, domains may also comprise arbitrary groupings. Furthermore, domains may be defined at any level of granularity. In fact, a domain may be created without any member devices, allowing devices to thereafter join the domain by acquiring a corresponding unique domain identifier. Furthermore, while member computing devices typically include content-consuming devices, member devices may also comprise other types of devices. For instance, some member computing devices may not consume content, but rather may distribute content to other devices.

FIG. 1 illustrates four exemplary domains, although countless other domains may exist. Domain 120, for instance, consists of devices that user 122 owns and operates. As illustrated, user 122 has registered the user's personal computer 118, as well as the user's portable media player (PMP) 124, with domain 120. License server 108 may accordingly bind a license associated with digital content to domain 120, such that each device within domain 120 that contains the digital content and the license may consume the content with use of and according to the policy of the issued license. As arrow 126 illustrates, personal computer 118 and PMP 124 may communicate with one another to exchange the digital content and the associated license such that each may consume the content.

In addition to domain 120, FIG. 1 illustrates domains 128, 130, and 132. Domain 128 includes PMP 124, as well as PMPs 128(1), (2), (3), . . . , (M). In exemplary domain 128, each member device may be a PMP of a certain make and/or model. For instance, each member device of domain 128 may comprise a Microsoft® Zune™ 30 gigabyte (GB) media player. Again, each Microsoft® Zune™ media player that is a member of domain 120 may consume digital content with an associated license that is bound to the domain. A similar exemplary domain may comprise a portion, substantially all (e.g., >90%), or all mobile phones serviced by a certain service provider.

In some instances, a content-consuming device may be a member of multiple domains and, as such, will contain multiple domain identifiers. PMP 124, for instance, is shown as being a member of domains 120, 128, and 130. Furthermore, because licenses may be bound to domains, content server 106 may pre-generate content and bind the content to a domain that may, at the time, have no members. Devices created after this time, however, may then acquire the proper domain identifier to become a member of the domain and to receive and consume this pre-generated content.

As mentioned above, PMP 124 is a device that is a member of multiple domains, including domain 130. In contrast with domain 128, domain 130 includes differing types of content-consuming devices, such as PMP 124, personal computers 130(1), 130(2), 130(N), 132(3), laptop computer 130(3), and mobile phone 130(4). This domain may also include any other types of content-consuming devices capable of consuming digital content.

Exemplary domain 130 includes all or substantially all (e.g., >90%) of a service or media provider's registered clients. Each member device of domain 130 therefore associates with a registered account with a service or media provider such as Rhapsody® or Napster®. Because domain 130 includes substantially all of the content-consuming devices registered with Rhapsody® or Napster®, substantially all of the service provider's clients may consume certain licensed digital content with a single license that is bound to domain 130.

Domain 130 may also be defined in a multitude of other ways. For instance, this domain may only include those devices with a premium service provider account. Alternatively or in addition, domain 130 may only include device's that meet certain system requirements (e.g., at least a 20 GB memory, etc.). These system requirements may in fact be required before enlisting in the domain, as discussed below with reference to FIG. 3.

Domain 132 illustrates yet another exemplary domain. Here, domain 132 consists of content-consuming devices of a family 134. If family 134 registers each of the family's devices with domain 132, then the domain may consist of all devices owned and operated by the family. As illustrated, domain 132 includes a mobile phone 132(1), a laptop computer 132(2), and personal computer 132(3). Again, personal computer 132(3) is also a member of domain 130. Domain 132 allows family 134 to share digital content and associated licenses bound to the domain amongst devices 132(1)-(3), such that each member device may consume the digital content without acquiring an additional license.

Having discussed the exemplary domains of FIG. 1, attention now turns to domain controllers. In the illustrated architecture, domain controllers control and manage one or more domains. While FIG. 1 illustrates only one such domain controller to manage each of domains 120, 128, 130, and 132, multiple domain controllers may also exist, possibly one for each illustrated domain.

FIG. 1 illustrates that domain controller 110 stores domain information 136 that pertains to each of the domains that domain controller 110 manages. Domain controller 110 generally stores this information in a database or the like. Domain information 136 includes a domain ID field 138, a device ID field 140, a domain controller (DC) uniform resource locator (URL) field 142, a key pair field 144, and an expiration field 146. Domain ID field 138 couples with device ID field 140 to maintain a list of registered devices for each domain that domain controller 110 controls. DC URL field 142, meanwhile, maintains a location of the domain controller. Here, domain controller 110 manages each of the illustrated domains. Therefore, the URL within each of the DC URL fields will contain a same URL. While FIG. 1 illustrates the domain controller's location in terms of a URL, other location information could be specified (e.g., an IP address).

Key pair field 144 maintains a listing of the domain public/private key pair for each domain. A public/private key associated with a domain will generally be issued to each content-consuming device that joins the corresponding domain. This issued key pair allows for each content-consuming device to prove membership to the domain, as well as to consume licensed content with licenses bound to the domain. This key pair is discussed in detail with reference to FIG. 2.

Finally, expiration field 146 indicates when the key pair associated with a domain expires. After the key pair expires, domain controller 110 may require each member device to receive an updated key pair in order to maintain membership in the domain. FIG. 1 illustrates that the key pairs associated domains 120 and 132 do not expire, while the key pair's of domains 128 and 130 expire in ninety and thirty days, respectively.

Architecture 100 illustrates how a DRM system may utilize member-based domains to issue digital content and associated licenses bound to a domain. Each member device within a domain may thus share the content and associated licenses with other member devices of the domain, such that the other member devices may consume the content without acquiring an additional license. Architecture 100 thus enables seamless movement and consumption of licensed digital content amongst member devices of a domain.

Figure 2:
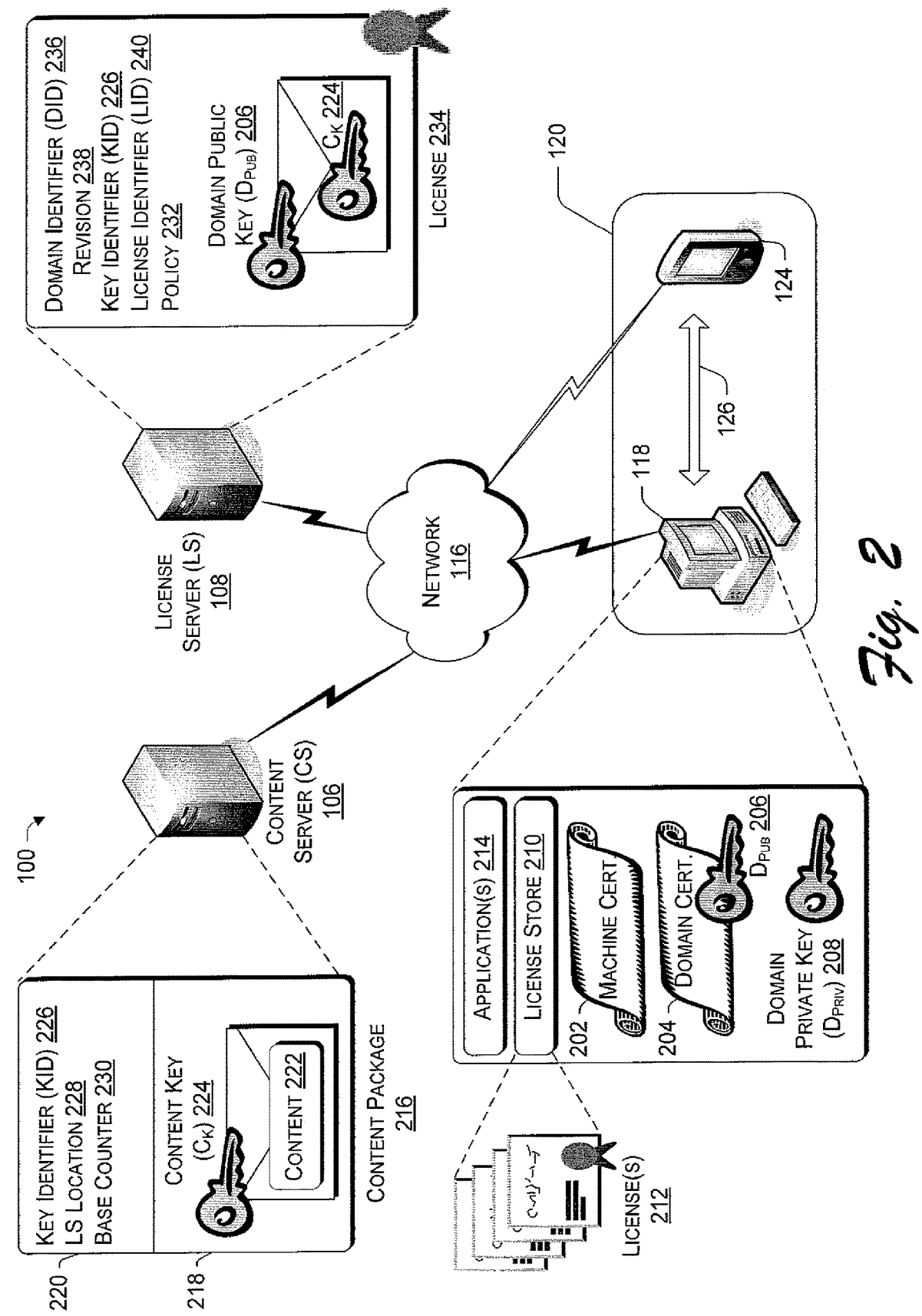
FIG. 2 illustrates exemplary components of the member-based domain architecture of FIG. 1, including a content server, a license server, and two content-consuming devices that are both members of a same domain.

FIG. 2 illustrates components of architecture 100 in greater detail, including content server 106, license server 108, and personal computer 118. As discussed above, content server 106 transfers content to a content-consuming device, such as personal computer 118. This content is often encrypted and therefore an associated license may be involved to manage consumption. License server 108 provides the associated license that is bound to a domain. Personal computer 118, which is a member of the domain, decrypts a portion of the license to enable decryption of the content. Personal computer 118 may then consume the content according to the policy of the license.

FIG. 2 illustrates sub-components of servers 106 and 108 and of personal computer 118 that are useful in so consuming digital content. First, personal computer 118 contains a machine certificate 202 that uniquely identifies personal computer 118. As discussed above, licenses traditionally bind to this machine certificate 202, such that only personal computer 118 can consume associated digital content.

In this instance, however, personal computer 118 is also member of a domain (namely domain 120), and thus stores a domain certificate 204. Domain certificate 204 serves as a domain identifier and attests to the computer's membership in the domain (in this case domain 120). Domain certificate 204 includes a domain public key 206, which may also serve to identify the computer as a member of a domain (again, in this instance domain 120). FIG. 2 thus illustrates that member-based domain architecture 100 allows a content-consuming device, such as personal computer 118, to acquire multiple identities—those associated with domains in addition to the hard-bound identity of the device itself.

Personal computer 118 also contains a domain private key 208 associated with domain. 120. Domain private key 208 allows personal computer 118 to decrypt portions of licenses bound to the domain, as discussed in detail with reference to FIGS. 3-5. Once decrypted, the licenses allow personal computer 118 to decrypt and consume associated digital content.

Although not illustrated, domain certificate 204 may also specify a revision. This revision generally corresponds to a time at which domain certificate 204 and corresponding domain key pair (206, 208) were created. The concept of revisions may be useful when domain keys become unsecured. When this occurs, license server 108 may only issue licenses to those domain members whose domain certificates have revisions that identify secure keys. The "Renewability" section below discusses this in detail.

Personal computer 118 also includes a license store 210 to store one or more licenses 212 locally on the computer. When personal computer 118 receives a license from license server 108, personal computer 118 generally stores the received license within license store 210 for potential future use.

Finally, personal computer 118 also includes one or more content-consuming applications 214. These applications typically recognize that certain digital content requires a license and the applications therefore trigger a request for the license to a license server. For instance, imagine that one of applications 214 is a media player. If user 122 of personal computer 118 tries to play a song with the media player, the player may recognize that the player needs a license in order to play the song. The media player therefore triggers a request for the appropriate license to license server 108, assuming that license store 210 does not already contain the appropriate license.

Content server 106, meanwhile, includes a content package 216 that comprises a content body 218 and a content header 220. Content body 218 includes digital content 222 (illustrated as content 222), such as a song, movie, game, or the like, and is encrypted by a content key 224. Digital content 222 may be encrypted by the Advanced Encryption Standard (AES) or any other suitable encryption process.

Content header 220 has various data fields or header elements, including a key identifier 226, a license-server location 228, and a base counter 230. Key identifier 226 serves to correlate digital content 222 within content package 216 to an appropriate license. Key identifier 226 therefore allows personal computer 118 to search license store 210 for a license with a matching key identifier. In addition, key identifier 226 allows personal computer 118 to request a corresponding license from license server 108, if the computer does not already have the license.

License-server location 228 identifies a location of an appropriate license server, such as license server 108, where personal computer 118 may request an appropriate license with a matching key identifier. For instance, if content server 106 is associated with a certain service provider such as Rhapsody®, then license-server location 228 may direct personal computer 118 to a Rhapsody® license server where personal computer may find a matching license. In some instances, license-server location 228 takes the form of a URL address.

Finally, base counter 230, couples with an acquired content key 224 to allow personal computer 118 to decrypt digital content 222. Note that while content header 220 does not specify policy, the header may in some instances. This policy would specify rights or restrictions by which personal computer 118 may consume digital content 222. If included, the policy within content header 220 would notify license server 108 of the specified rights or restrictions. License server 108 would then retrieve and/or generate a license with corresponding policy.

FIG. 2 further illustrates that license server 108 includes a license 234, which itself includes a domain identifier 236, a revision 238, key identifier 226, a policy 232, a license identifier 240, and content key 224 encrypted by domain public key 206. Again, in this example domain public key 206 is associated with domain 120.

Domain identifier 236 associates license 234 with domain 120. In some instances where a domain consists of member devices registered with a particular service provider, domain identifier 236 comprises a service provider identification and an account identification. The former identifies the service provider itself and the latter identifies a user's (e.g., user 122) account with the service provider. Domain identifier 236 also may allow license 234 to ensure that a content-consuming device (e.g., personal computer 118) on which the license resides does indeed contain a domain certificate corresponding to the license.

As discussed briefly above, revision 238 denotes which revisions of a domain certificate are allowed to consume digital content associated with license 234. Just as domain identifier 236 allows the license to ensure that the content-consuming device has a proper domain certificate, revision 238 allows license 234 to ensure that the domain certificate is of the proper revision.

Key identifier 226 within the license, meanwhile, correlates content and associated policy to the license. In this instance, this license's key identifier (226) matches the key identifier (226) of content package 216. As such, license 234 corresponds to content package 216. Note also that policy 232 of license 234 specify rights or restrictions by which personal computer 118 may consume digital content 222. In instances where content header 222 contains policy, policy 232 may match the policy of content package 216. License identifier 240, meanwhile, tags license 234 with a unique identity of license 234. License 234 may thus be tracked for various purposes as it is shared amongst members of domain 120.

Finally, license 234 includes content key 224, which is encrypted by domain public key 206. Therefore, should personal computer 118 receive license 234, personal computer 118 (and application(s) 214) may use domain private key 208 to decrypt content key 224. In addition, should personal computer 118 receive content package 216, personal computer 118 (and application(s) 214) may decrypt digital content 222 with use of content key 224 and base counter 230. At this point, personal computer 118 (and application(s) 214) may consume digital content 222 according to policy 232.

Also as illustrated by FIG. 2, personal computer 118 may provide digital content 222 and license 234 to portable media player (PMP) 124. Since PMP 124 is also a member of domain 120, PMP 124 also contains domain private key 208. PMP 124 may thus decrypt content key 224 and, with the content key, decrypt digital content 222 and consume the content according to the policy of the license.

Joining a Domain

Figure 3:
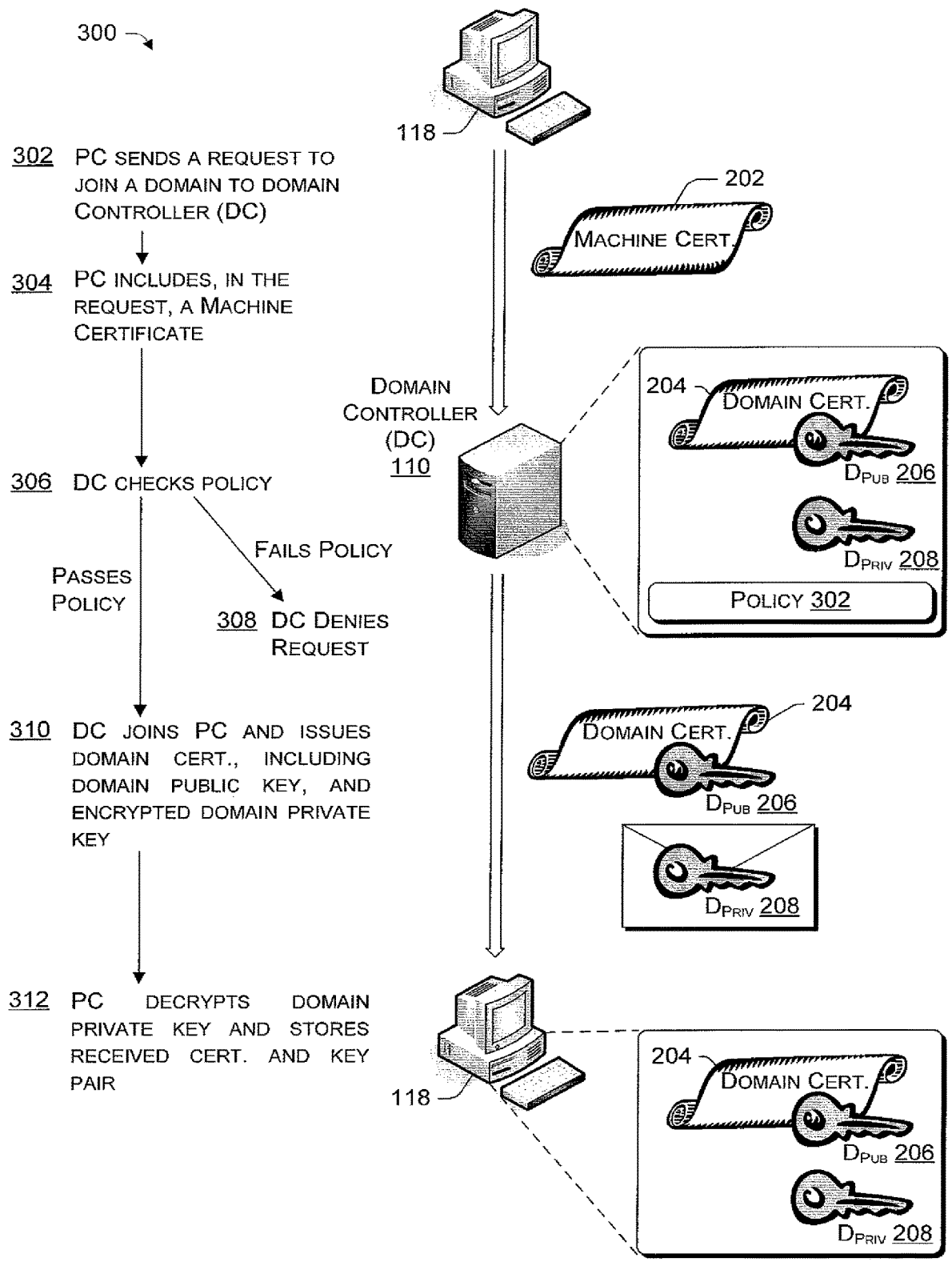
FIG. 3 illustrates an exemplary process for joining a device such as a content-consuming device to a domain, such that the content-consuming device may consume digital content according to licenses bound to the domain.

FIG. 3 illustrates an exemplary process 300 for joining a computing device, such as a content-consuming device, to a domain. Process 300, as well as other processes described throughout, represents a sequence of operations that can be implemented in hardware, software, or a combination thereof. In the context of software, the blocks represent computer instructions that, when executed by one or more processors, perform the recited operations. Although process 300 is described with reference to personal computer 118, process 300 is applicable to any type of computing device, such as those illustrated in FIG. 1. Furthermore, note that process 300 describes personal computer joining domain 120 and, as such, the same domain certificate and key pair of FIGS. 1-2 will also be described.

At operation 302, personal computer 118 sends a request to domain controller 110 to join domain 120. Operation 304 represents that the computer includes, in the request, machine certificate 202 that identifies personal computer 118. Alternatively, personal computer 118 may send other identifiers to domain controller 110. Furthermore, the domain certificate or other identifications may be sent separately from, rather than included with, the request.

At operation 306, domain controller 110 receives the request and accompanying certificate and checks policy before enlisting the computer. This policy may comprise any number of restrictions that relate to the requesting device, the domain to which the device wishes to join, or both. For instance, personal computer 118 may be limited to membership in a maximum number of domains (e.g., five). In this instance, the domain controller may validate that personal computer 118 does not currently enlist in this maximum number of domains. In other instances, the domain itself may limit the domain's number of member devices. Domain controller 110 may thus ensure that the domain has not reached this limit before joining personal computer 118. In still other instances, this policy may require that personal computer 118 meet certain system requirements before being allowed to join the domain. Of course, in some instances domain controller 110 may not check policy at all.

Operation 308 represents that domain controller 110 denies the computer's request to join the domain if the request fails the policy. If the request passes the policy, however, operation 310 represents that domain controller 110 joins personal computer 118 to domain 120 and issues a domain-specific identity. As discussed above, this domain-specific identity may take the form of domain certificate 204, which again includes domain public key 206. Domain controller 110 also issues domain private key 208.

In some instances, domain private key 208 is encrypted, possibly with use of a machine public key within machine certificate 202. As a result, domain private key 208 may be decrypted with a machine private key. This type of encryption creates a secure channel between domain controller 110 and personal computer 118, allowing only personal computer 118 to decrypt the domain private key. Of course, domain private key 208 may be encrypted in other ways, or may not be encrypted at all.

Finally, at operation 312, personal computer 118 decrypts domain private key 208 and stores this key, along with domain certificate 204 and domain public key 206, in memory.

Figure 4:
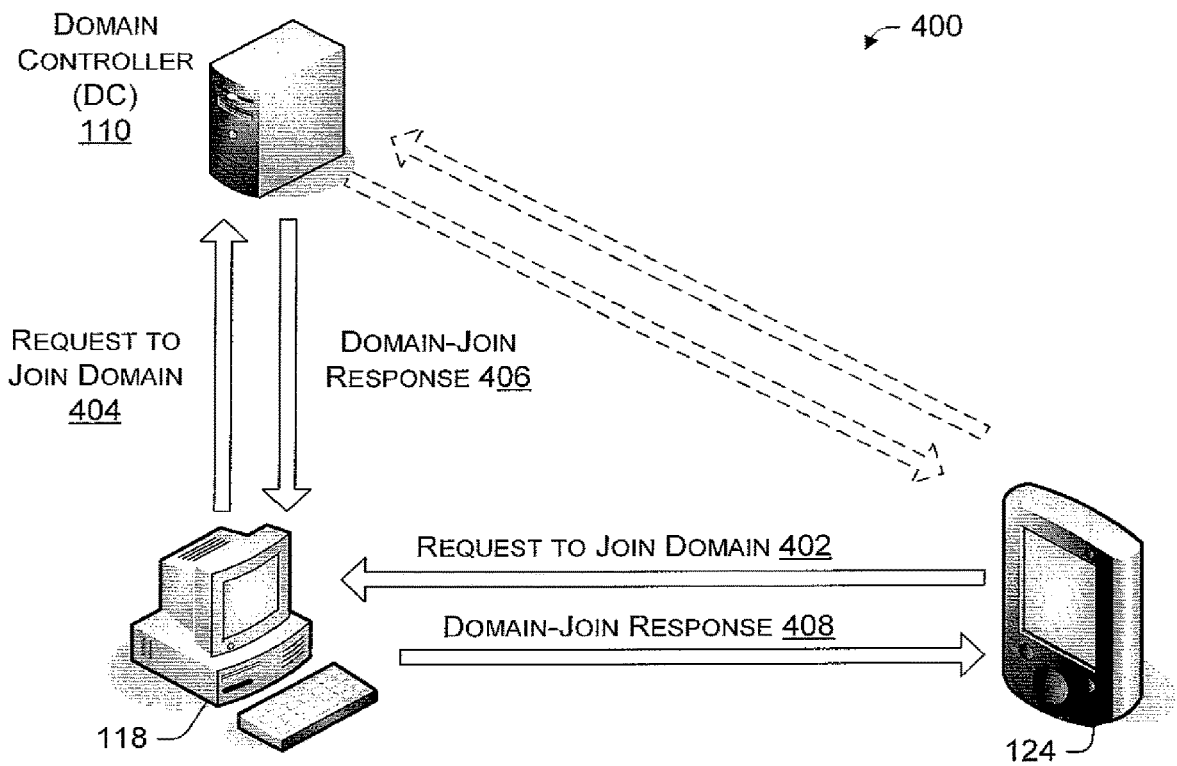
FIG. 4 illustrates an exemplary process which allows a device, such as a portable content-consuming device, to join a domain via communication with another content-consuming device.
Figure 5:
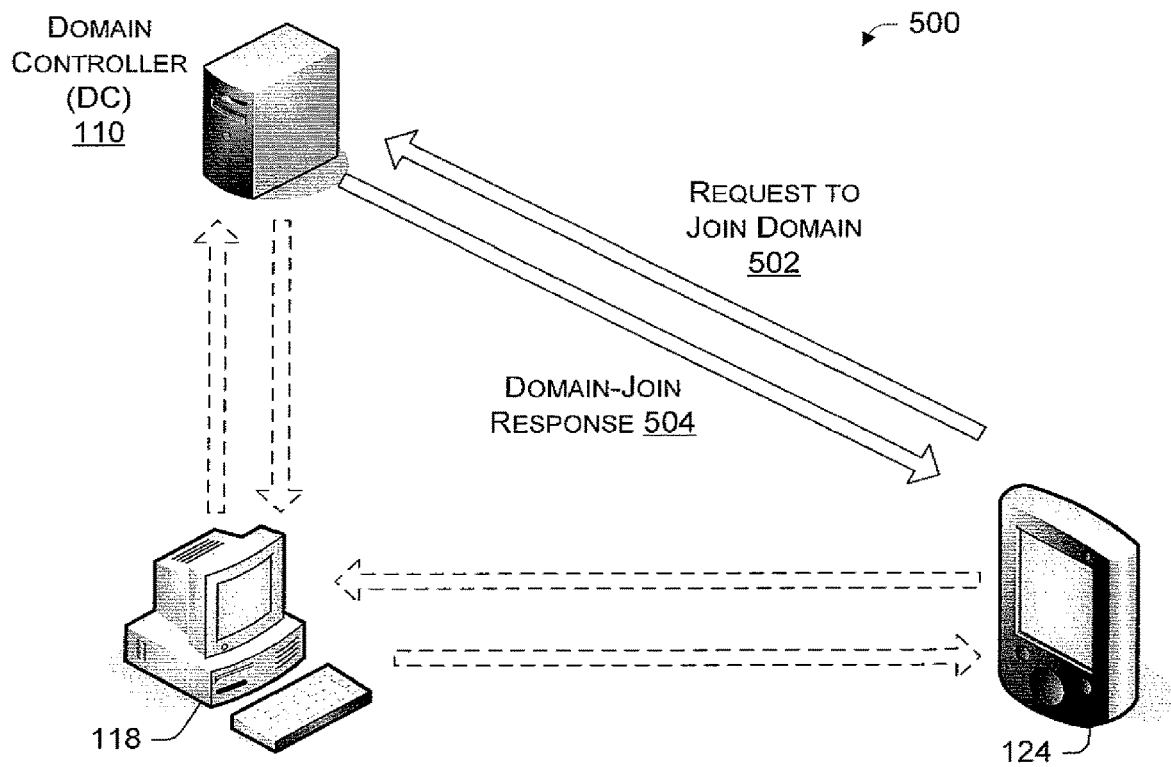
FIG. 5 illustrates an exemplary process which allows a device, such as a portable content-consuming device, to join a domain via direct communication with a domain controller.

FIGS. 4-5 illustrate exemplary ways in which a computing device, such as a content-consuming device (and in particular a portable device, such as PMP 124), may join a domain. These processes highlight additional actions facilitated by joining certain devices such as portable devices, and do not replace the protocol of process 300. Instead, the processes of FIGS. 4-5 may be utilized in conjunction with and in addition to process 300.

FIG. 4 illustrates a process 400 for indirectly joining a content-consuming device, such as a portable device, to a domain via communication with another content-consuming device. While this process may be used without regard to whether or not the joining device connects to a network, this process is particularly useful where the device does not so connect. Furthermore, while process 400 is described with reference to personal computer 118 and PMP 124, other devices may similarly utilize this process.

At operation 402, PMP 124 sends a request to join a domain to personal computer 118. At operation 404, personal computer 118 communicates this request to domain controller 110. Domain controller 110 receives the request and sends a response to personal computer 118 at operation 406. At operation 408, PMP 124 receives the response from domain controller 110 via personal computer 118.

FIG. 5, meanwhile, illustrates a process for directly joining a content-consuming device, such as a portable device, to a domain. If domain controller 110 is remote from the portable device, then the portable device may need to connect to a network such as network 116 in order to perform process 500. Therefore, process 500 may be particularly useful for portable devices that connect to the Internet or the like. Operation 502 represents PMP 124 sending a request to join a domain to domain controller 110. Again, PMP 124 is used only for illustration and other devices may utilize this process. At operation 504, PMP 124 receives a response from domain controller 110. If PMP 124 is successful in joining the domain, then PMP 124 may consume digital content with use of licenses bound to the domain as described above.

Consuming Digital Content at a Member Device of a Domain

Having illustrated and discussed a member-based domain architecture, an exemplary process for receiving digital content and domain-bound licenses will now be described with reference to FIGS. 6-7. With digital content and an associated domain-bound license, a content-consuming device that is a member of the appropriate domain may consume the content according to the policy of the license.

Figure 6:
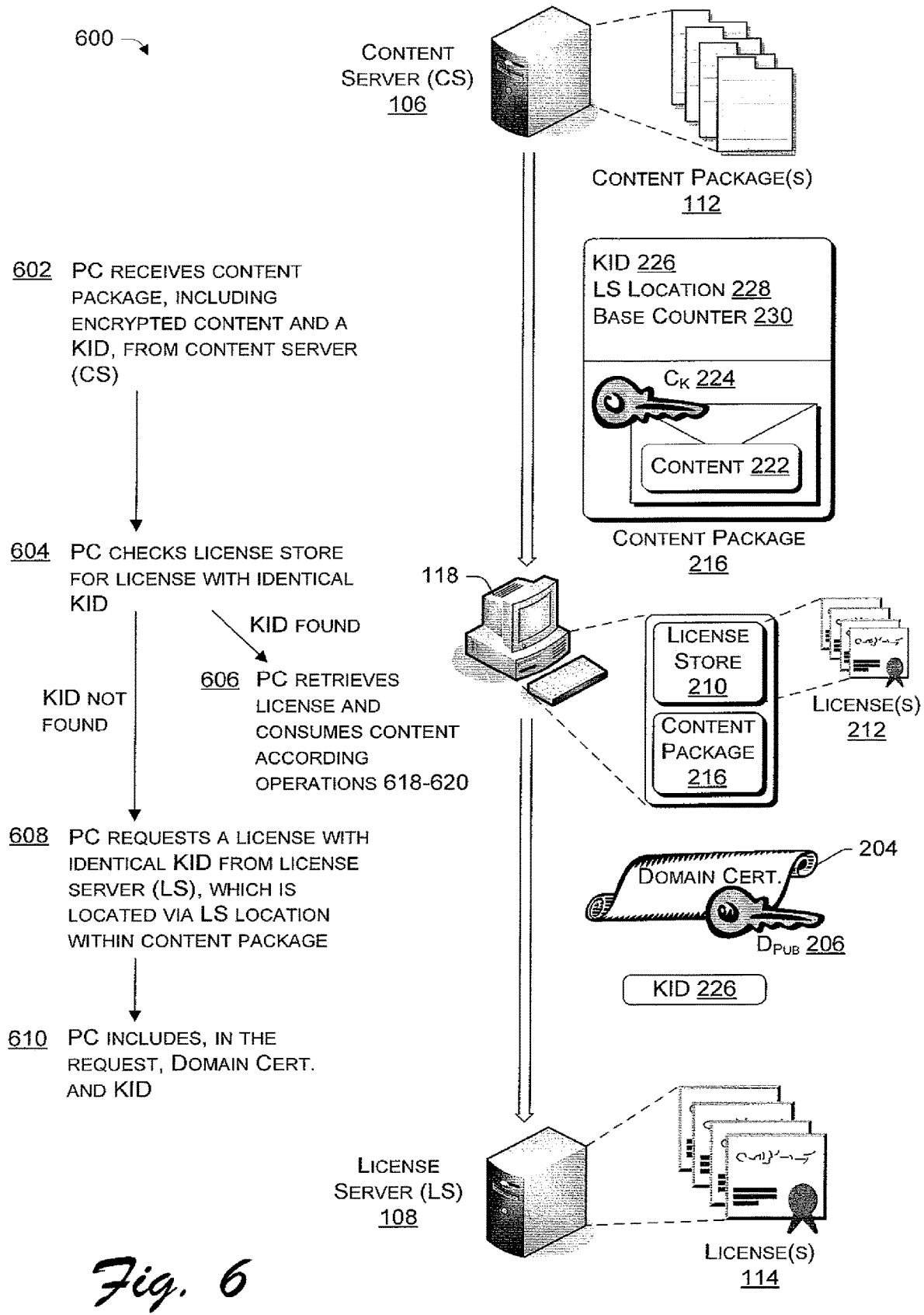
FIGS. 6-7 illustrate an exemplary process for receiving digital content and a license bound to a domain at a content-consuming device that is a member of the domain, such that the content-consuming device may consume the digital content with use of the license.

FIG. 6 begins illustration of an exemplary process 600. While process 600 is described with reference to personal computer 118, this computer is only representative and may be substituted with any other device enabled to communicate with content server 106 and/or license server 108. At operation 602, personal computer 118 receives content package 216 (as illustrated in FIG. 2) from content server 106. Importantly and amongst other things, content package 216 includes encrypted digital content 222 and key identifier 226. As discussed above, key identifier 226 allows digital content 222 to correlate with a corresponding license.

At operation 604, personal computer 118 checks license store 210 to determine if the computer already has a license with a matching key identifier. If personal computer 118 finds a license with a matching key identifier, then at operation 606 the computer retrieves the license from the store and is able to consume the content (in accordance with operations 618-620).

Meanwhile, if the computer does not so find a license with a matching key identifier, then personal computer 118 sends a request at operation 608 to license server 108. Personal computer 118 uses license-server location 228 to identify where license server 108 resides and, hence, where to send the computer's request. In some instances, license-server location 228 is a uniform resource locator (URL) address, as FIG. 1 illustrates.

Operation 610 represents that personal computer 118 includes, in the request, key identifier 226 that identifies the license that the computer may utilize to consume digital content 222. The request may or may not also include policy. When included, policy may enable license server 108 to include the proper policy within the license. Personal computer 118 may also send to the license server proof that the computer is indeed a member the domain, such as domain 120. This proof may enable the computer to communicate with the license server, which is associated with a particular domain controller in some instances. As illustrated, this proof takes the form of domain certificate 204 that includes domain public key 206. License server 108 may use this domain identification not only to verify that personal computer 118 is indeed a domain member, but also to bind the license to the domain.

Furthermore, domain certificate 204 (included in the request) includes the revision of the certificate. License server 108 may use this revision to ensure that personal computer 118 has an up-to-date and secure key pair. If the revision is not current enough, however, then license server 108 may deny the request for the license, as discussed in detail in the "Renewability" section below.

Figure 7:
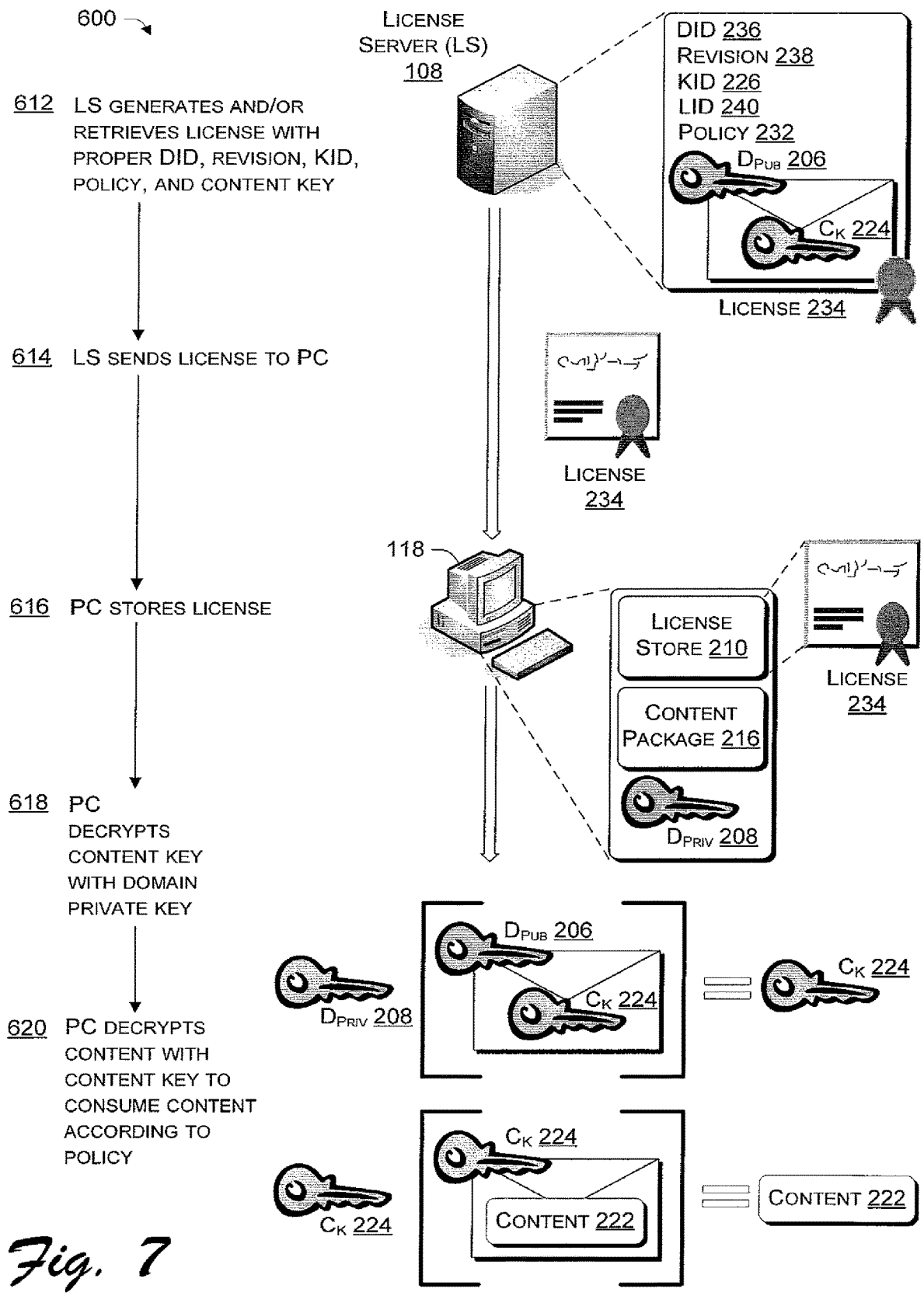

FIG. 7 continues illustration of process 600. After receiving the request and domain certificate from personal computer 118, license server 108 generates and/or retrieves license 234 at operation 612. License 234 includes a proper domain identifier 236, revision 238, key identifier 226, policy 232, as well as license identifier 240. Of course, in some implementations the license may exclude some or all of these elements. License 234 also includes content key 224, which domain public key 206 encrypts. Due to this encryption, only devices with the corresponding domain private key 208 (and hence, only members of the corresponding domain) may decrypt content key 224.

While FIG. 7 illustrates domain public key 206 encrypting content key 224, the content key may be encrypted in other ways. This may be true, for instance, if license 234 comprises a portion of a chain license. Whatever the configuration of the encryption, content key 224 is generally encrypted in a manner that allows domain members and only domain members to decrypt the key.

Returning to FIG. 7, license server 108 sends license 234 to personal computer 118 at operation 614. At operation 616, personal computer 118 receives license 234 and stores it, generally in license store 210. Personal computer 118 then decrypts content key 224 with domain private key 208 at operation 618. Operation 620 represents that personal computer 118 may then decrypt digital content 222 with content key 224 (and possibly also with base counter 230). Once the content is decrypted, personal computer 118 may then consume digital content 222 according to policy 232 of license 234. In addition, personal computer 118 may share digital content 222 and license 234 with one or more other members of the domain, such that the other member devices may likewise consume digital content 222 without acquiring an additional license.

Sharing Digital Content Amongst Member Devices of a Domain

Figure 8:
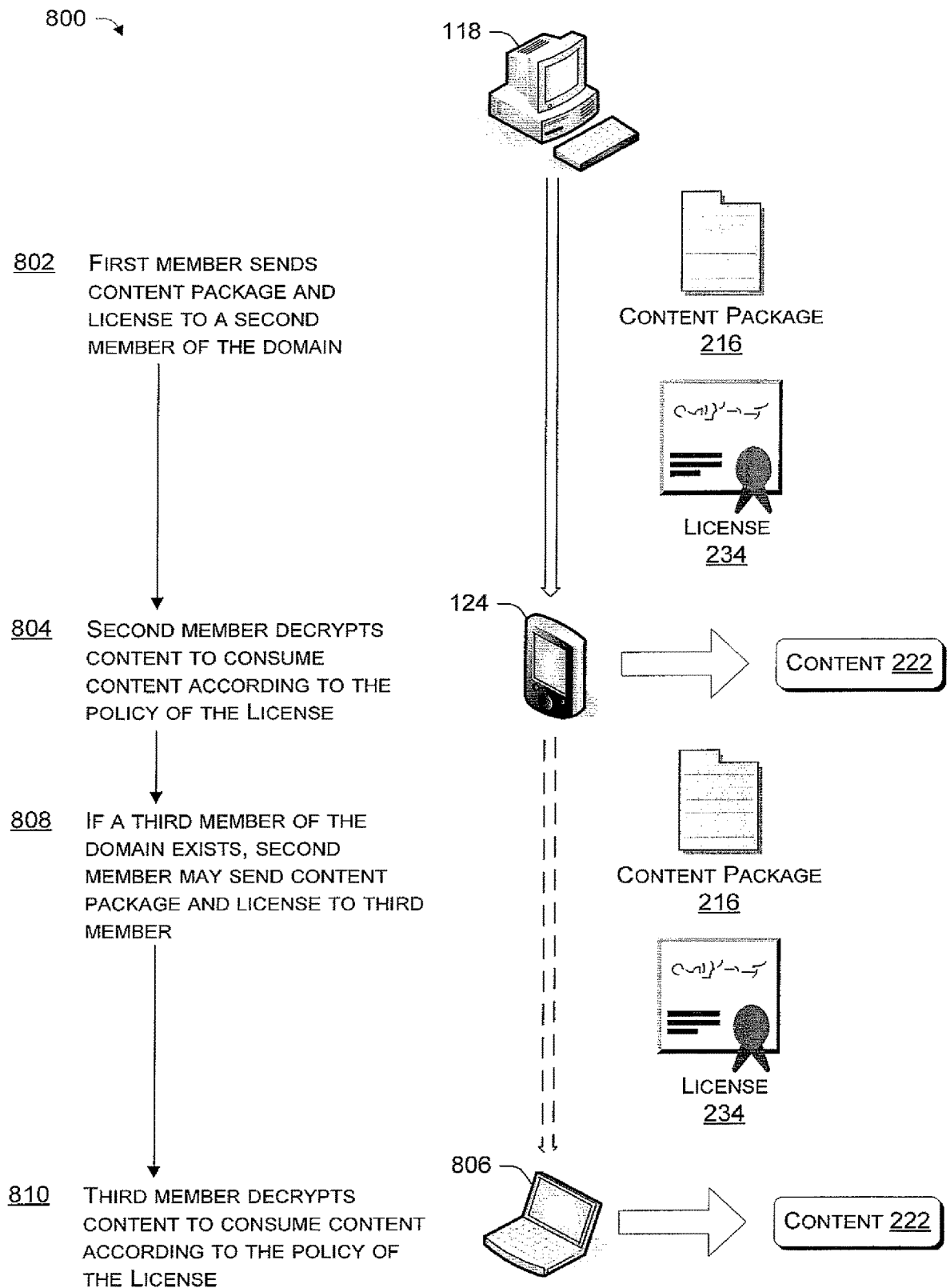
FIG. 8 illustrates an exemplary process for sharing digital content and a license associated with the digital content and bound to a domain amongst multiple members of the domain, such that each member may consume the digital content.

FIG. 8 illustrates an exemplary process 800 for sharing digital content and a domain-bound license associated with the digital content amongst multiple member devices of the domain. Each member device may then consume the digital content, according to the policy of the license and without acquiring an additional license.

Operation 802 represents an exemplary first domain member (e.g., personal computer 118) sending or otherwise providing content package 216 and license 234 to a exemplary second member device of the domain (e.g., portable media player (PMP) 124). Of course, the second member device could also acquire license 234 from license server 108 in the same manner as the first member device. In either case, operation 804 represents the second member device decrypting digital content 222 to enable consumption of the content according to policy 232 of license 234.

Furthermore, if a third member device (e.g., laptop 806) of the domain exists, then the second member device may send or otherwise provide the content and the license to the third member device. Operation 808 represents this sending. At operation 810, the third member device decrypts digital content 222 to consume the content.

Figure 9:
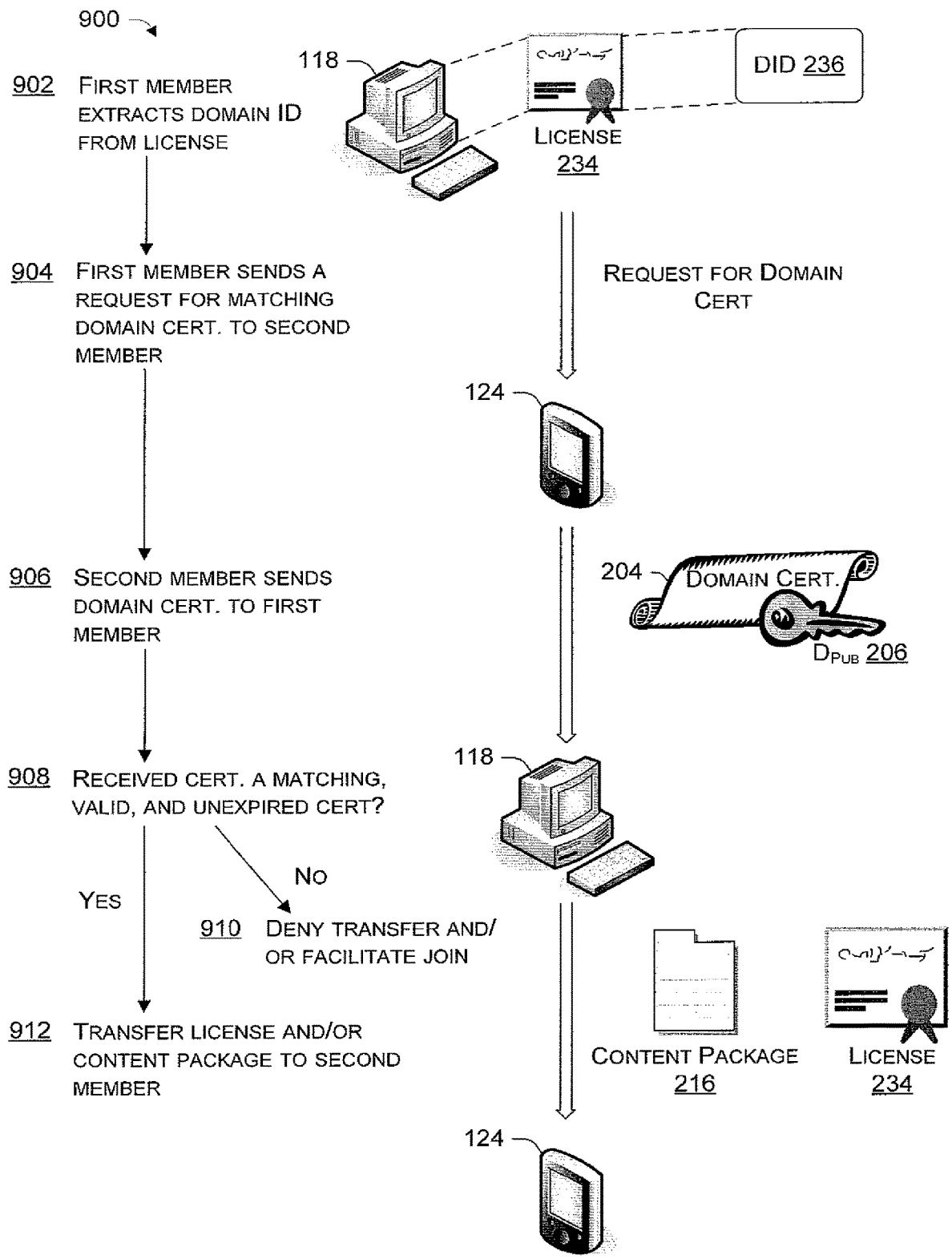
FIG. 9 illustrates a specific implementation of the exemplary sharing process of FIG. 8.

FIG. 9 illustrates an exemplary process 900 for providing the second member device of FIG. 8 with content package 216 and license 234 in response to a request from the second member device. At operation 902, the first member of the domain extracts domain identifier 236 (which identifies domain certificate 204) from license 234. At operation 904, the first member device sends a request for a matching domain certificate to the second member device. Operation 906 represents that the second member device receives the request and sends a domain certificate to the first member device.

At operation 908, the first member device receives the domain certificate from the second member device and questions whether the received certificate matches the domain certificate that domain identifier 236 identifies. By doing so, the first member device checks to see that the second member device is indeed a member of the domain (e.g., domain 120). The first member device may or may not also question whether the received certificate is valid and unexpired at operation 908.

If the second member device's certificate does not match, is not valid, or is expired, then the first member device denies transfer of the content and/or license at operation 910. The first member device may also facilitate a domain join for the second member device at operation 910. If, however, the second member device's certificate is a valid, unexpired, and matching domain certificate, then the first member device may transfer license 234 and content package 216 to the second member device. Of course, in some instances, the second member device may already have content package 216. In these instances, the first member device may only transfer license 234 to the second member device.

Leaving a Domain

Figure 10:
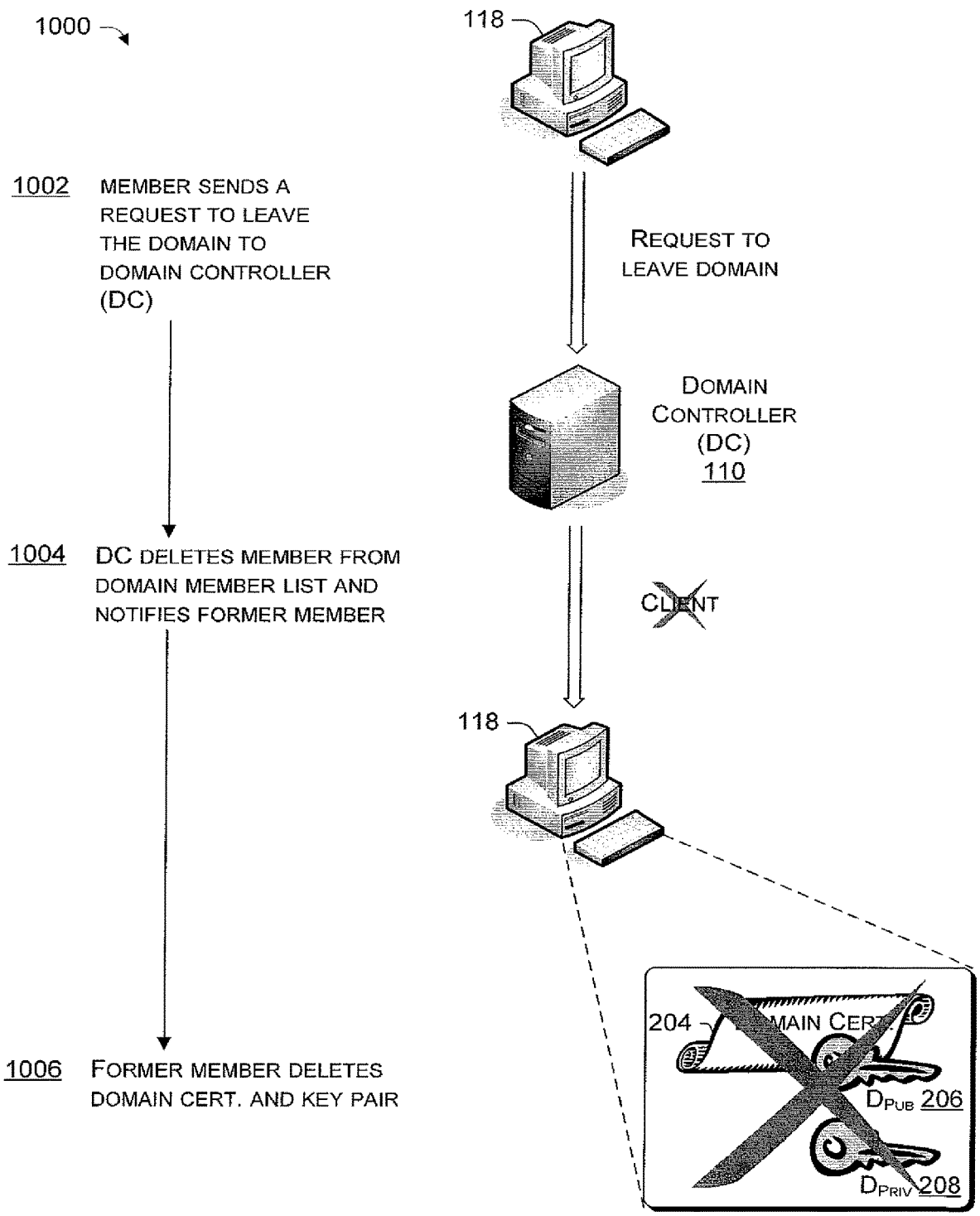
FIG. 10 illustrates an exemplary process for leaving a domain.

In some instances, a user of a member device may choose to leave the domain. This may be true, for instance, if the device is limited to the number of domains to which the device may join. The user of the device may therefore choose to leave one domain in order to free the device to join another domain. FIG. 10 illustrates an exemplary process 1000 for leaving a domain.

At operation 1002, a domain member (e.g., personal computer 118) sends a request to leave the domain to a corresponding domain controller (e.g., domain controller 110). The domain member may identify a location of the corresponding domain controller by extracting a location (e.g., a URL address) from the corresponding domain certificate. At operation 1004, the domain controller deletes the member device from a domain member list and notifies the former member device of the deletion. Finally, the former member device deletes a corresponding domain certificate and key pair at operation 1006. The former member device may or may not also delete any licenses bound to that domain. Note that while FIG. 10 illustrates the domain member sending a request to leave to the domain controller before deleting the corresponding domain certificate and key pair, the domain member could also first delete these items before sending the request to leave.

A user of a member device may also wish to leave a domain if, for instance, the member device has been lost or broken. In this instance, the member device would not be able to access the domain controller and, as such, would not be able to leave the domain via process 1000. Therefore, a user may utilize an "offline" leave in this instance. This offline leave may consist of calling or logging into the domain controller and requesting that that the user's member device be removed from the domain. In some instances, the domain controller may choose to limit the number of offline leaves for a single user.

Renewability

Although domain key pairs are generally stored on a domain member in an encrypted and secure fashion, these keys may be discovered or hacked in some circumstances. For instance, software associated with a domain member or with a domain may be breached, leaving associated domain keys unsecured. In other instances, a service provider may unintentionally leak out an associated domain's private key or key pair. Whatever the breach, a license server, such as license server 108, may choose to no longer issue licenses to these unsecured keys. A license server may therefore require a domain member whose keys are unsecured (or all members of a domain whose keys are unsecured) to have a certain revision of a domain certificate and/or public key before issuing licenses to the domain member. Note that in some instances, however, the domain member's existing licenses may still function to allow the member to consume the associated digital content. In some of these instances, this domain member may also transfer these licenses to other domain members, who may also use these existing licenses to consume the content.

Returning to the illustration of FIG. 6, operation 608 represents personal computer 118 sending a request for a license to license server 108. As illustrated and described at operation 610, this request may include the computer's domain certificate 204. This domain certificate generally includes a revision that identifies when the corresponding private key or key pair was created. When license server 108 receives the request, the license server may not only ensure that the domain certificate identifies the proper domain, but also that the revision identifies a secure key or keys. Generally, if no breach has been reported since the time that private key or key pair was created (as identified by the revision), then the license server will issue a license.

If, however, a breach has been reported between the time the key or keys were created and the request for the license, then license server 108 may deny the request. In some instances, the license server may direct personal computer 118 to corresponding domain controller 110 in addition to denying the request. The domain controller may thereafter issue an updated private key or key pair. Additionally, the domain controller may update the revision of domain certificate 204, or the domain controller may issue a new domain certificate with a new revision. Furthermore, in some instances the domain controller (by itself or in conjunction with one or more other domain controllers) may require that personal computer 118 update its private key or key pair for any other domains of which personal computer 118 is a member.

In some instances, revisions of a domain certificate may comprise a version number. In these instances, a first revision of a domain certificate would be revision one, a second revision being revision two, and so on. In other instances, revisions comprise monotonically-increasing or chronological timestamps. These timestamps indicate that a second updated key or key pair was created after a first key or key pair. In addition, these timestamps, as opposed to mere version numbers, allow for consistency amongst members of a domain.

For instance, imagine that a first member of a domain has a revision of "2007-07-15 08:15:45", while a second of the domain has a revision of "2007-0922 22:50:07". A breach, meanwhile, occurs on Dec. 10, 2007 and is reported that day. A new private key or key pair may therefore be created later that day, and timestamped as "2007-12-10 20:44:33".

Now imagine that both the first and second member devices request a license from license server 108 on Dec. 20, 2007. Because both the first member device's revision and the second member device's revision represent a time before the time of the breach, the license server will typically deny their request for a license. Instead, both member devices may be re-directed to the domain controller. The domain controller may then issue each of the member devices a new private key or key pair with a revision of "2007-12-10 20:44:33". Therefore, both the first member device and the second member device now have certificates with identical revisions, despite the fact that their previous revisions were not identical. Finally, note that domain controller may also issue a new key or key pair for the other domains in which the first and second member devices enlist.

Content Preview

In some instances, content providers such as content server 106 may wish to allow one or more content-consuming devices to consume some but not all of some digital content. Conversely, content server 106 may wish to allow the one or more content-consuming devices to consume the entire digital content, but only for a limited amount of time or for a limited number of plays. For instance, a content provider may wish to offer a content preview experience in order to allow device users an opportunity to decide whether or not to purchase rights to the entire digital content. This section discusses techniques associated with such a content preview experience. While these content preview techniques may utilize the member-based domain architecture 100 of FIG. 1, these techniques may also utilize other architectures including traditional DRM-system architectures.

In some instances, content preview techniques may utilize architecture 100 (either with or without domains 120, 128, 130, and 132) that includes content server 106 and license server 108 connected to multiple content-consuming devices via network 116. In these instances, some or all of licenses 114 within license server 108 may be preview licenses. Like the licenses discussed above, preview licenses generally include policy specifying rights or restrictions by which content-consuming devices are allowed to consume certain digital content. These rights or restrictions, meanwhile, may allow the content-consuming devices to consume some but not all of the digital content. These rights or restrictions may also include those discussed above, such as play counts, expiration date, output protections, and the like.

Similar to the discussion of FIGS. 1-2 above, a content-consuming device (e.g., personal computer 118) may receive a content package 112 that includes digital content 222. The device may then receive a preview license from license server 108. The device utilizes the preview license to consume some but not all of digital content 222. Depending on the rights or restrictions of the preview license, the device may instead or in addition utilize the preview license to consume all of digital content 222 but only for a limited amount of time or for a limited number of plays. Of course, if the preview license binds to a domain (e.g., domain 120), the device may decrypt a content key (e.g., content key 224) within the license with use of a domain private key (e.g., domain private key 208). The device may then decrypt digital content 222 with use of the content key to consume some but not all of the content, as specified by the preview license.

Figure 11:
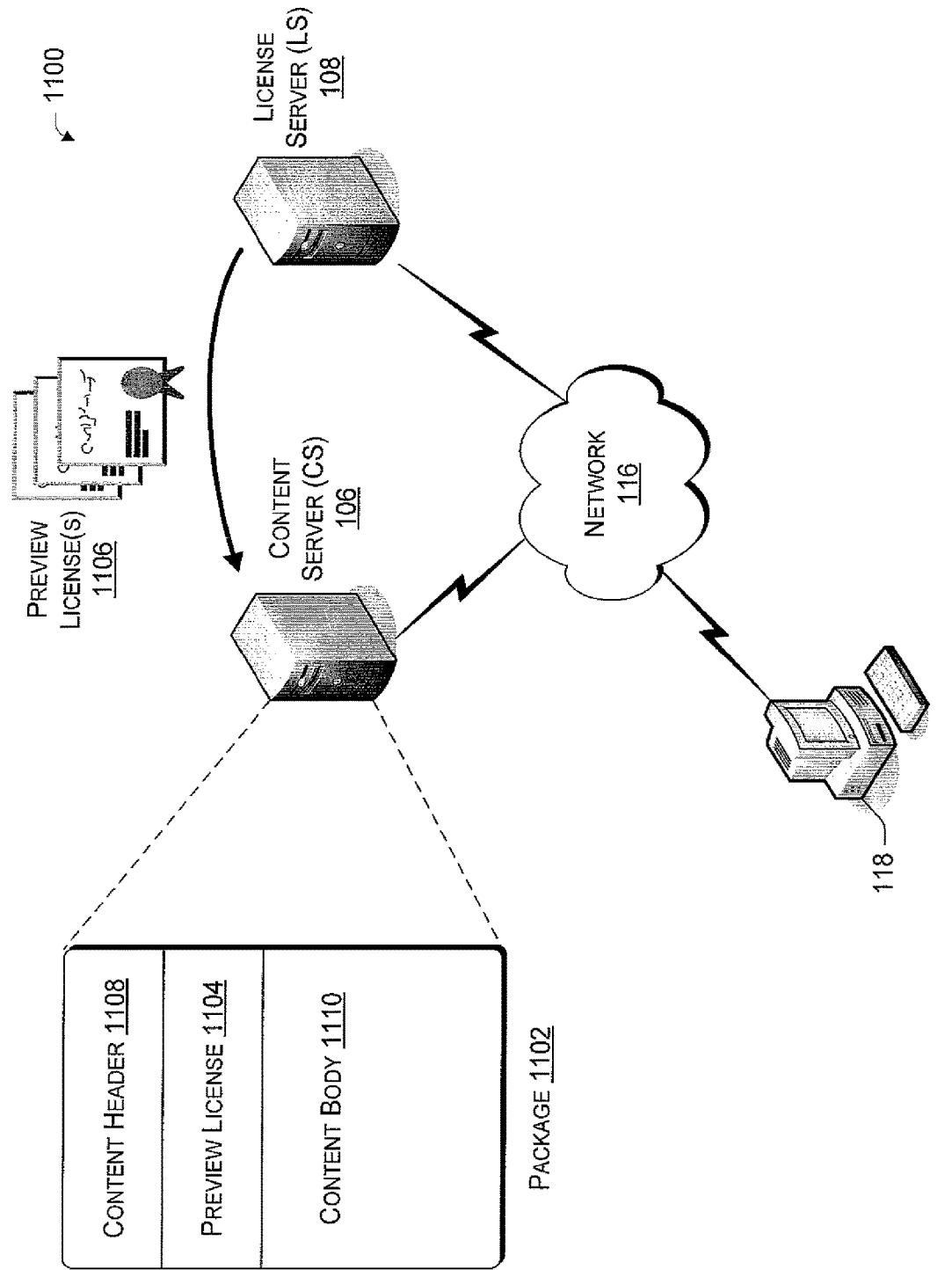
FIG. 11 illustrates exemplary components of the member-based domain architecture of FIG. 1, including a content server configured to distribute a package that includes digital content and an associated embedded preview license.

While this preview license may be delivered separately from content package 112 as FIG. 1 illustrates, the preview license may also couple to the content package before delivery to a computing device, such as a content-consuming device. Reference is now made to FIG. 11, which illustrates an architecture 1100 for providing a package 1102 to personal computer 118. The package includes a preview license 1104 embedded therein. While FIG. 11 illustrates personal computer 118, any device may similarly utilize this architecture.

Architecture 1100 also illustrates license server 108 providing one or more preview licenses 1106 to content server 106. Of course, both servers 106 and 108 may combine to form a single server, in which case the single server may itself generate licenses 1106. In any event, in the illustrated embodiment content server 106 receives preview licenses 1106 to embed them within content packages. Package 1102 is exemplary and includes preview license 1104, a content header 1108, and a content body 1110. Content header 1108 may contain the same or similar features as content header 220. Content body 1110 may also contain the same or similar features as content body 218. Content header 1108 and content body 1110 are described below in more detail with reference to FIG. 12.

Once content server 106 embeds preview license 1104 within package 1102, the content server provides package 1102 to personal computer 118 for consumption according to policy of the preview license. Content server 106 may also provide package 1102 to multiple other content-consuming devices.

For instance, imagine that preview license 1104 is bound to a domain such as domain 130. As discussed above, domain 130 includes all or substantially all of a service or media provider's registered clients. Each member device of domain 130 may therefore have a registered account with a service or media provider such as Rhapsody® or Napster®. This service or media provider may therefore choose to send package 1102 to each member device, such that each member device may enjoy the preview experience according to preview license 1104.

Furthermore, because preview license 1104 would be bound to domain 130, each member device could share the license and content with other member devices of domain 130. The other member devices may then enjoy the preview experience without acquiring an additional license.

Figure 12:
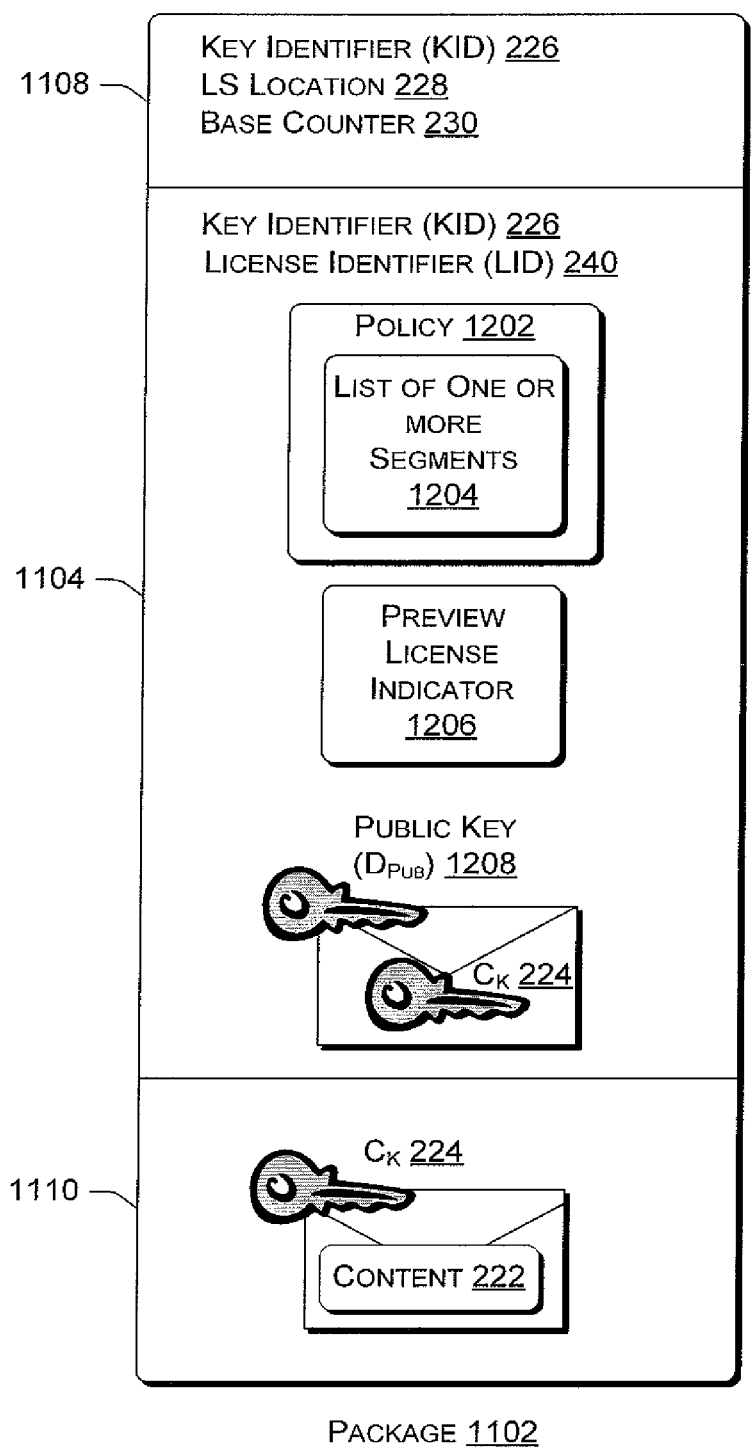
FIG. 12 illustrates a specific implementation of the package of FIG. 11.

FIG. 12 illustrates package 1102 in greater detail. First, FIG. 12 shows content header 1108 as including key identifier 226, license-server location 228, and base counter 230. In some instances, package 1102 may also specify policy. Key identifier 226, license-server location 228, and base counter 230 have been discussed above and may perform similar or identical functions as those discussed with regard to FIG. 2. If the package includes policy, meanwhile, this policy may specify that a content-consuming device should be allowed to consume some but all of the included digital content. This policy may instead or in addition specify that the content-consuming device should be allowed to consume some or all of the digital content but only for a limited amount of time or for a limited number of plays.

Next, FIG. 12 illustrates content body 1110 as including encrypted digital content 222. As discussed above, this digital content may comprise a song, movie, game, mobile-phone ring tone, image, and/or the like. Furthermore, digital content 222 may define an entire digital work or merely a portion. In this instance, content key 224 encrypts digital content 222, also as discussed above.

Finally, FIG. 12 illustrates exemplary details of preview license 1104. As shown, preview license 1104 includes key identifier 226, which correlates to the key identifier within content header 1108. The license also includes license identifier 240, discussed above with regard to FIG. 2. In addition, preview license 1104 includes policy 1202, preview license indicator 1206, and content key 224, encrypted by some sort of public key 1208 such as domain public key 206.

As discussed above, policy 1202 generally specifies rights or restrictions that allow content-consuming devices to consume some but not all of digital content. To so specify, policy 1202 includes a list of one or more segments 1204 that delineates which segment or segments of digital content 222 a content-consuming device is allowed to consume. In addition, policy 1202 may include other rights and restrictions. Policy 1202 may instead or in addition specify that the content-consuming device should be allowed to consume some or all of the digital content but only for a limited amount of time (e.g., one day) or for a limited number of plays (e.g., five plays).

Imagine, for instance, that digital content 222 is a song issued by an online music provider. In this instance, list 1204 may specify that a device is allowed to consume a first portion of the song. If, however, digital content 222 is a movie or the like, then list 1204 may specify multiple non-contiguous segments of the movie that the device is allowed to consume. As such, list 1204 would identify segments that the device would be allowed to consume and in which order the device may so consume the segments. These multiple non-contiguous segments may be spaced throughout the entire digital content. Therefore, when the device consumes the segments in the specified back-to-back order, a device user may receive a preview experience of the movie. In other Words, list 1204 may essentially define a trailer for the movie. Furthermore, if digital content 222 is a game, then policy 1202 and list 1204 may specify that the device is allowed to play a certain level of the game. Conversely, policy 1202 and list 1204 may specify that the device may play the game for a certain amount of time, or for a certain play count.

Preview license indicator 1206, meanwhile, functions to notify a content-consuming device that license 1104 is indeed a preview license. In some instances, preview license indicator 1206, in conjunction with the content-consuming device, may accordingly offer an upsell to the user of the device after the device consumes digital content 222, possibly according to the one or more segments specified by list 1204. If the user purchases the offered upsell, then the content-consuming device acquires additional rights for consuming digital content 222. For instance, purchasing the upsell may allow the device to consume all or substantially all of digital content 222. In the case of a song, movie, or game, an upsell may allow the device to consume all or substantially all of the song, movie, or game, respectively. The offered upsell may also allow the content-consuming device to consume the digital content for a greater amount of time (e.g., indefinitely) or for a greater number of plays (e.g., indefinitely).

In some instances, package 1102 may include an additional upsell license that the user may purchase. This additional license allows the device to consume the additional content or consume the content for a greater amount of time or plays. In other instances, the device may receive an additional upsell license from license server 108 or the like in response to the user's purchasing of the upsell. Preview license 1104 therefore allows a user of a device to enjoy a content preview, while also allowing the user the option of purchasing additional rights should the user so choose. When bound to a domain, preview license 1104 also allows the user to share the content and the preview license with other member devices. Each member device may accordingly enjoy the preview experience without acquiring an additional license.

Managing Digital Rights for Multiple Assets in an Envelope

Traditionally, digital-rights-management (DRM) systems employ a file format that specifically targets protection of audio and/or video content only. Traditional DRM systems do not efficiently protect other types of content and also lack capability to protect collections of data. That is, traditional DRM systems generally only provide protection for a single and self-contained digital work, such as a song or movie, rather than collections of differing data types.

Figure 13:
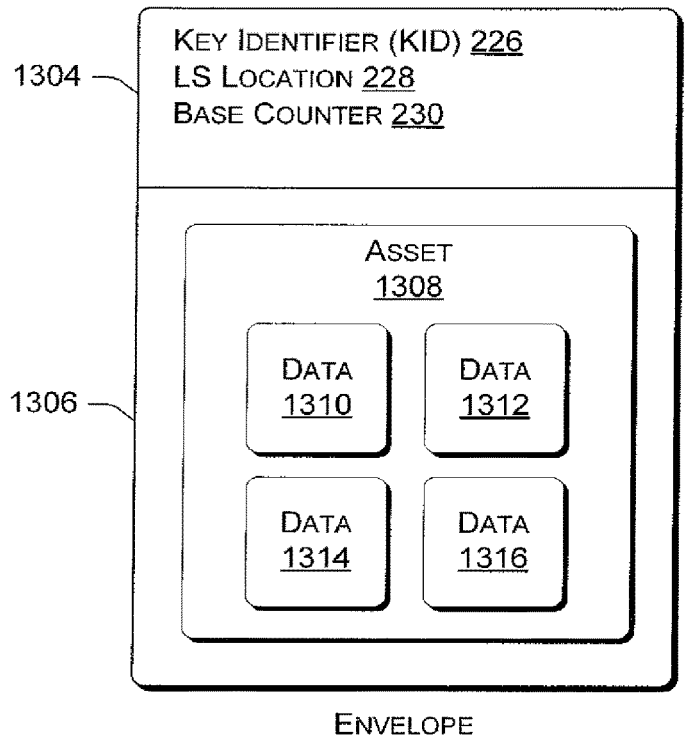
FIG. 13 illustrates an envelope that contains an asset comprising multiple pieces of data, some of which may be of differing formats.

FIG. 13 illustrates an exemplary envelope 1302 capable of containing a collection of data having differing and possibly arbitrary data types or formats, and capable of managing digital rights associated with that collection. As illustrated, envelope 1302 includes a header 1304 and a file portion 1306. Envelope 1302 also includes an asset 1308 within file portion 1306. An asset generally comprises a logical grouping of one or more pieces of data. Different assets may comprise different logical groupings. For instance, one asset may comprise a song, while another asset may comprise a movie. Still another asset may comprise a game or a level of a game. While these assets are exemplary, multiple other assets may exist and may be defined at any level of granularity. For instance, two assets (e.g., a first level and a second level of a game, respectively) may combine to form another asset (e.g., the game itself). Assets may therefore comprise a grouping of numerous pieces of data, each of which may help form multiple assets.

With reference to FIG. 1, content server 106 may issue envelope 1302 to content-consuming devices as illustrated by architecture 100 of FIG. 1. That is, each of content packages 112 of FIG. 1 may comprise an envelope or a group of envelopes defined as an archive. In addition, envelope 1302 may contain an embedded license in some instances, such that a content-consuming device will receive envelope 1302 and an associated license simultaneously. Furthermore, while envelopes and archives may operate within the member-based domain architecture of FIG. 1, these envelopes and archives may also operate in other architectures including traditional DRM systems.

In the illustrated embodiment, asset 1308 includes pieces of data 1310, 1312, 1314, and 1316. In this instance, data 1310, 1312, 1314, and 1316 comprise data of arbitrary and differing file formats. That is, asset 1308 may include data having any type of data format. In some instances, data within asset 1308 includes data with formats selected from a group consisting of audio format, video format, image format, document format, and application format. In still other instances, data within asset 1308 contains some combination of audio or video data and non-audio/video data.

In one instance, asset 1308 represents a level of a game. As such, data 1310 may be video clips for that level, data 1312 audio clips for the level, data 1314 resource files for the level, and data 1316 world descriptions for that level. Each piece of data 1310, 1312, 1314, and 1316 thus combines to form what a game user would view as the level of the game. Envelope 1302 thus allows each portion of the game level to be grouped together by creation of asset 1308.

In addition, FIG. 13 illustrates header 1304 as including key identifier 226, license-server location 228, and base counter 230. In some instances, header 1304 could include policy assigned to asset 1308. The first three listed elements may function in a same or identical manner as discussed above in regards to FIG. 2. For instance, key identifier 226 may correlate asset 1308 and an associated policy with a license, the license to enforce policy against the asset. License-server location 228, meanwhile, generally identifies a license server to issue the license to enforce the policy. Again, in some instances license-server location 228 comprises a uniform resource locator (URL) address. Finally, base counter 230 may help to decrypt asset 1308, if the asset is encrypted.

If the content-consuming device does not have the identified license (e.g., within license store 210 of FIG. 2), then the device may request the license from the license server identified by license-server location 228. In some instances, the received license that enforces the policy may be bound to a domain. As such, the content-consuming device may consume the asset according to the policy of the license, if the device is a member of the domain. In addition, the device may share the asset and the license with other domain members, such that the other member devices may consume the asset according to the policy without acquisition of another license.

The policy that the license specifies, meanwhile, defines rights or restrictions by which a content-consuming device is allowed to consume asset 1308. These rights or restrictions may comprise all of those discussed above, such as play counts, expiration dates, output protections, and the like. If one or more assets in envelope 1302 define a game or the like, then additional policy may allow a content-consuming device to perform the following: play the game, play the game for a limited amount of time, play a single level, play for an accumulated amount of gaming time, play for a certain amount of real time, play for a limited number of gaming sessions, and/or the like. In addition, the policy may associate with a preview license, such that the content-consuming device may consume some but not all of asset 1308 (or may consume all of the asset for a limited time or number of plays) as discussed above in the "Content Preview" section.

Whatever rights or restrictions the policy specifies, the content-consuming device uses the received or retrieved license to obtain a content key, such as content key 224. The device may do so according to implementations discussed above in regards to FIGS. 6-7. Once the content key is obtained, the device may then consume asset 1308 according to the policy.

With reference back to envelope 1302, the grouping of multiple pieces of data into single asset 1308 allows policy to be applied to data of differing data formats. For example, return to the example where asset 1308 represents a level of a game. By grouping these pieces of data that define the game level, and by applying a single policy to the asset, envelope 1302 allows the entire game level to be governed by the same policy. In addition, envelope 1302 allows policy for the entire game level to be defined in a single package. This single package (i.e. envelope 1302) may then be sent to a content-consuming device to consume that level of the game with use of a license to enforce the specified policy.

Figure 14:
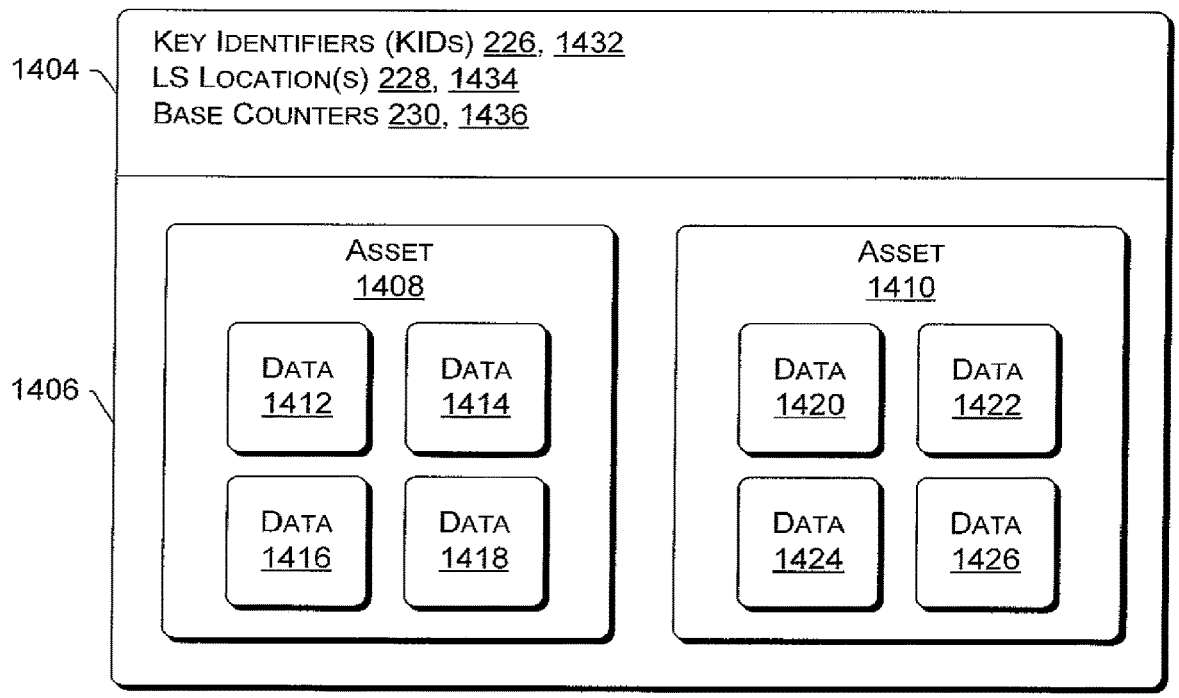
FIG. 14 illustrates an envelope that contains two assets, each of which may be assigned a differing and arbitrary policy.

FIG. 14 illustrates another envelope 1402. Again, envelope 1402 includes a header 1404 and a file portion 1406. While FIG. 14 illustrates a single header, envelope 1402 may include multiple headers, possibly one for each asset within the envelope, as discussed below.

As illustrated, envelope 1402 includes two assets: asset 1408 and asset 1410. Asset 1408 includes pieces of data 1412, 1414, 1416, and 1418. Asset 1410, meanwhile, includes pieces of data 1420, 1422, 1424, and 1426. As discussed above, the data within either or both of these assets may include data of differing and/or arbitrary data formats. For instance, some of this data may be audio, some video, some resource files, and still others may be other arbitrary data types and formats.

Due this envelope's inclusion of two assets, envelope 1402 may assign two differing policies (enforced by one or more licenses) to the two assets: a first policy that corresponds to asset 1408 and a second policy that corresponds to asset 1410. While these policies may be the same, these policies may also differ and, hence, may specify different rights or restrictions by which a content-consuming device may consume assets 1408 and 1410. For instance, the first policy may specify that a content-consuming device may play and copy asset 1408. The second policy, meanwhile, may specify that the content-consuming device may play—but not copy—asset 1410. As such, envelope 1402 thus enables a content-consuming device to receive multiple assets, each comprising data of differing and arbitrary data formats, and each specifying a differing and arbitrary assigned policy. The content-consuming device may then request one or more licenses to consume asset 1408 according to the first policy and asset 1410 according to the second policy.

As noted above, FIG. 14 illustrates single header 1404, although envelope 1402 may include multiple headers. In some instances, each asset may include an individual header. As illustrated, however, single header 1404 includes key identifier(s) 226 and 1432, license-server location(s) 228 and 1434, and base counters 230 and 1436. These key identifiers, license-server locations, and base counters typically function in the same manner as discussed above.

Key identifier 226, for instance, corresponds to asset 1408 and functions to correlate a license with asset 1408 and an associated policy (e.g., the "first policy" discussed above). This key identifier may therefore allow a content-consuming device to receive a proper license to enforce a specified policy against asset 1408. As discussed at length above, when a content-receiving device receives key identifier 226, the device searches for a license with a matching key identifier stored on the device in license store 210. If no such license is found, then the device requests the license from a license server such as license server 108. License-server location 228 identifies the appropriate license server to issue a license with key identifier 226. Furthermore, base counter 230 couples with an acquired content key to allow the device to decrypt asset 1408, also as discussed above.

Because key identifier 226, license-server location 228, and base counter 230 all correspond to asset 1408, this information may be included a header that couples to the corresponding asset.

Key identifier 1432, license-server location 1434, and base counter 1436, meanwhile, all correspond to asset 1410. As such, this information may reside within an individual header that couples to asset 1410. As illustrated, however, this information resides in single header 1404 with the other information corresponding to asset 1408. Whether in an asset-specific header or a single header, key identifier 1432 again correlates a license to asset 1410 and an associated policy (e.g., the "second policy" discussed above). In some non-illustrated instances, the key identifier for asset 1410 actually comprises the same key identifier as for asset 1408, namely key identifier 226.

License-server location 1434, meanwhile, identifies a server to issue a license associated with key identifier 1432. In some non-illustrated instances, the license-server location for asset 1410 is the same as the license-server location for asset 1408. As such, a same license server (e.g., license server 108) may issue licenses (or a single license) for both asset 1408 and asset 1410. Finally, base counter 1436 couples with an acquired content key to allow the content-consuming device to decrypt asset 1410.

Figure 15:
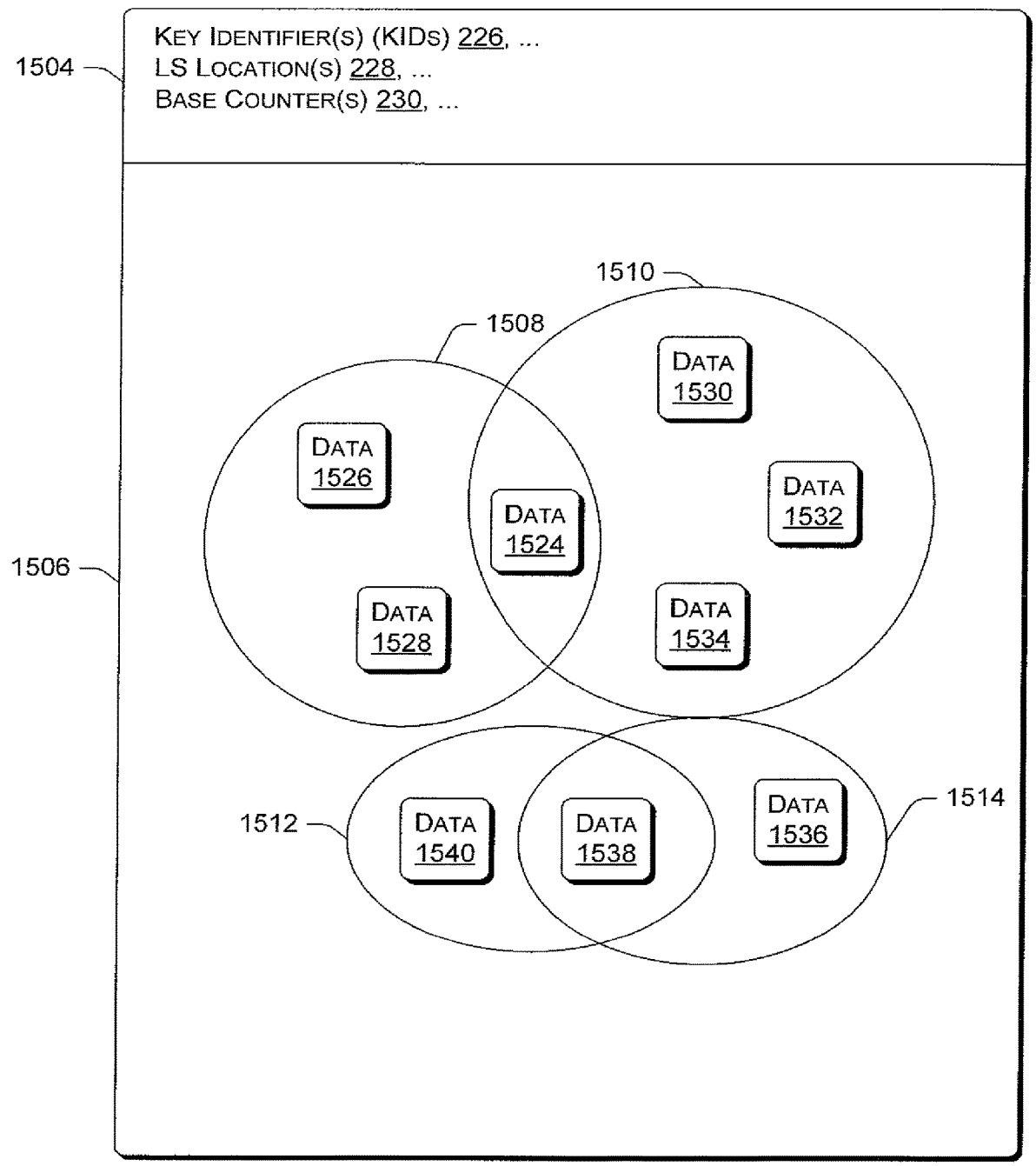
FIG. 15 illustrates an envelope that contains multiple assets, some or all of which may be assigned differing and arbitrary policy.

FIG. 15 illustrates a third envelope 1502. Again, envelope 1502 includes a header 1504 and a file portion 1506. Envelope 1502 includes assets 1508, 1510, 1512, and 1514. While this envelope includes four assets, any number of assets with any number of associated policies may be includes within other envelopes.

Similar to envelopes 1302 and 1402, a collection of data generally defines each asset 1508, 1510, 1512, and 1514. Again, this data may comprise data of varying data formats. Furthermore, each asset may be assigned a policy, each of which may comprise arbitrary policy. Some or all of these policies may again differ from one another. Finally, while FIG. 15 represents one header with a key identifier, license-server location, and base counter for each asset, envelope 1502 may also include multiple headers. Similar to envelopes 1302 and 1402, envelope 1502 may include an associated header for each asset within the envelope.

Envelope 1502 additionally illustrates that certain pieces of data may form a portion of multiple assets. For instance, both assets 1508 and 1510 include data 1524. Because data 1524 forms a portion of two assets, this piece of data may essentially be assigned two differing key identifiers specifying two different policies at the same time. To remedy this potential problem, at least two possible solutions exist. First, assets 1508 and 1510 could each be assigned different collection identifiers. These collection identifiers would specify policy for the collection as a whole and, hence, would specify different rights or restrictions for data 1524 depending on which asset the data currently groups with. Another solution is to divide assets 1508 and 1510 into three different groups consisting of: (1) data 1526 and data 1528; (2) data 1524, and (3) data 1530, data 1532, and data 1534. Different policy could then be assigned to each of the three groups, allowing data 1524 to be assigned unique policy in accordance with its membership in two different assets.

Figure 16:
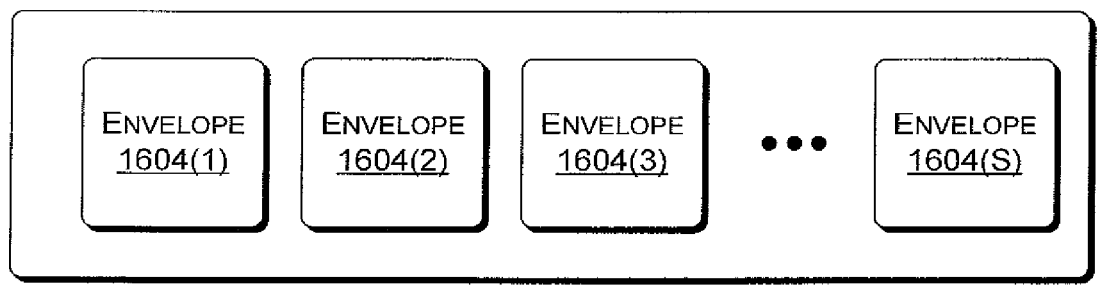
FIG. 16 illustrates an archive that comprises multiple envelopes, some of which may comprise the envelopes of FIGS. 13-15.

Finally, FIG. 16 illustrates an archive 1602. Archive 1602 includes one or more envelopes 1604(1), (2), (3), . . . , (S). These envelopes may contain some or all of the characteristics described above with reference to envelopes 1302, 1402, and 1502.

A content provider such as content server 106 may package these multiple envelopes together to define archive 1602. A content-consuming device may then download or otherwise receive archive 1602. The device then typically acquires one or more licenses including each specified policy, such that the device may consume each asset within each envelope according to each assigned policy.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processors and
   memory storing instructions that when executed by the one or more processors perform a method comprising:
   sending, by a first content-consuming device, a request to join a domain, the domain including devices of a particular make and model, the request indicating the first content-consuming device is the particular make and model;
   joining the domain based on one or more policies relating to the first content-consuming device, the one or more policies specifying system requirements for the first content-consuming device, the system requirements specifying the particular make and model;
   based at least on the first content-consuming device being a member of the domain, receiving a package including digital content and a preview license associated with the digital content, wherein the preview license:
   is bound to the domain;
   identifies the domain;
   controls access of the first content-consuming device to one or more portions of the digital content, the one or more portions defining less than all of the digital content; and
   enables each member device of the domain to consume the one or more portions; decrypting the digital content to access the one or more portions; and
   consuming the one or more portions in accordance with the preview license.

2. The system of claim 1, the method further comprising receiving, after the consuming of the one or more portions, an offer to purchase additional rights associated with the digital content, such that the first content-consuming device is allowed to consume one or more additional portions of the digital content.

3. The system of claim 1, the method further comprising distributing the digital content and the preview license to a second content-consuming device of the domain, the preview license enabling the second content-consuming device to consume the one or more portions according to the preview license being bound to the domain without the second content-consuming device acquiring an additional license.

4. The system of claim 1, the method further comprising:
   accessing a content key contained in the preview license by decrypting the content key with a domain private key that is specific to the domain sending the preview license;
   using the content key to decrypt the digital content; and
   consuming the one or more portions of the digital content for a limited amount of time or for a limited number of plays.

5. The method of claim 1, wherein each member device of the domain is a portable media player of the particular make and model.

6. The method of claim 1, wherein domain membership is limited by a maximum number of member devices.

7. A method comprising:
   sending, by a first content-consuming device, a request to join a domain, the domain including devices of a particular make and model, the request indicating the first content-consuming device is the particular make and model;
   joining the domain based on one or more policies relating to the first content-consuming device, the one or more policies specifying system requirements for the first content-consuming device, the system requirements specifying the particular make and model;
   receiving, by the first content-consuming device, digital content and a preview license associated with the digital content based at least on the first content-consuming device being a member of the domain, wherein the preview license:
   is bound to the domain;
   identifies the domain;
   controls access to one or more portions of the digital content, the one or more portions defining less than all of the digital content; and
   enables each member device of the domain to consume the one or more portions; decrypting the digital content to access the one or more portions; and
   consuming the one or more portions in accordance with the preview license.

8. The method of claim 7, further comprising receiving, after the consuming of the one or more portions, an offer to purchase additional rights associated with the digital content, such that the first content-consuming device is allowed to consume one or more additional portions of the digital content.

9. The method of claim 7, further comprising distributing the digital content and the preview license to a second content-consuming device of the domain, the preview license enabling the second content-consuming device to consume the one or more portions according to the preview license being bound to the domain without the second content-consuming device acquiring an additional license.

10. The method of claim 7, further comprising:
accessing a content key contained in the preview license by decrypting the content key with a domain private key that is specific to the domain sending the preview license;
using the content key to decrypt the digital content; and
consuming the one or more portions of the digital content For a limited amount of time or for a limited number of plays.

11. The method of claim 7, wherein each member devices of the domain is a portable media player of the particular make and model.

12. The method of claim 7, wherein domain membership is limited by a maximum number of member devices.

13. The method of claim 7, wherein receiving the preview license comprises:
receiving a key identifier along with the digital content, the key identifier identifying the preview license.

14. The method of claim 13, further comprising:
using the key identifier to check a license server to determine whether the first content-consuming device comprises the preview license matching the key identifier; and
when the first content-consuming device does not comprise the preview license, retrieving the preview license from the license server.

15. The method of claim 7, wherein the preview license is hound to the domain based on a domain certificate that comprises a domain public key, the domain public key identifying the first content-consuming device as a member of the domain.

16. The method of claim 15, wherein the domain certificate further comprises a revision identifier, the revision identifier identifying a current key pair for the domain.

17. A method comprising
establishing a first domain having one or more policies specifying system requirements for a particular make and model of device;
obtaining a first preview license including a policy that governs rights and restrictions applicable to digital content, the preview license controlling consumption of the digital content by the devices included in the first domain;
sending, to a first member device of the first domain, a package having the digital content and the first preview license, the first member device having the make and model;
providing, by the first member device, the package to a second member device of the first domain;
decrypting the digital content to access decrypted digital content; and
enabling the second member device to consume the decrypted digital content according to the first preview license.

18. The method of claim 17, wherein the first member device and the second member device are portable media players of the particular make and model.

19. The method of claim 17, further comprising:
providing, by the second member device, the package to a third member device of the first domain; and
enabling the third member device to consume the digital content according to the first preview license.

20. The method of claim 17, wherein the first member device is a member of a second domain and comprises a second preview license, the second preview license being bound to the second domain and controlling consumption of the second digital content by the first member device.

* * * * *